US008218431B2

(12) United States Patent
Takase et al.

(10) Patent No.: US 8,218,431 B2
(45) Date of Patent: Jul. 10, 2012

(54) GATEWAY DEVICE

(75) Inventors: Masaaki Takase, Kawasaki (JP);
Mitsuyasu Ogawa, Kawasaki (JP);
Kenichi Fukuda, Kawasaki (JP);
Masafumi Katoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 827 days.

(21) Appl. No.: 12/029,879

(22) Filed: Feb. 12, 2008

(65) Prior Publication Data

US 2008/0198864 A1 Aug. 21, 2008

(30) Foreign Application Priority Data

Feb. 15, 2007 (JP) ................................. 2007-035193

(51) Int. Cl.
*H04L 12/28* (2006.01)
(52) U.S. Cl. ......... 370/221; 370/217; 370/237; 370/401
(58) Field of Classification Search .................. 370/401, 370/389, 221, 217, 237; 379/265
See application file for complete search history.

(56) References Cited

U.S. PATENT DOCUMENTS

| | | | | | |
|---|---|---|---|---|---|
| 5,920,705 | A | * | 7/1999 | Lyon et al. ..................... | 709/240 |
| 6,167,025 | A | * | 12/2000 | Hsing et al. ..................... | 370/216 |
| 6,542,499 | B1 | * | 4/2003 | Murphy et al. ................ | 370/352 |
| 6,657,965 | B1 | * | 12/2003 | Shaffer et al. .................. | 370/238 |
| 6,882,653 | B1 | * | 4/2005 | Kiuchi et al. .................. | 370/401 |
| 2002/0141562 | A1 | * | 10/2002 | Matsuura ................. | 379/220.01 |
| 2002/0198937 | A1 | * | 12/2002 | Diwan et al. .................. | 709/203 |
| 2003/0174648 | A1 | * | 9/2003 | Wang et al. ..................... | 370/235 |
| 2004/0258239 | A1 | * | 12/2004 | Gallant et al. ................ | 379/900 |
| 2005/0117717 | A1 | * | 6/2005 | Lumsden ..................... | 379/88.22 |
| 2005/0198276 | A1 | * | 9/2005 | Shiga et al. ..................... | 709/224 |
| 2006/0112170 | A1 | * | 5/2006 | Sirkin ........................... | 709/217 |
| 2007/0071221 | A1 | * | 3/2007 | Allen et al. ............... | 379/265.01 |
| 2007/0156919 | A1 | * | 7/2007 | Potti et al. ..................... | 709/238 |
| 2007/0191004 | A1 | * | 8/2007 | Yamakawa et al. ........... | 455/433 |
| 2008/0159288 | A1 | * | 7/2008 | Nagarajan et al. ............ | 370/392 |

FOREIGN PATENT DOCUMENTS

| | | |
|---|---|---|
| JP | 2001-333114 | 11/2001 |
| JP | 2002-290551 | 10/2002 |
| JP | 2003-309650 | 10/2003 |

* cited by examiner

*Primary Examiner* — Dang Ton
*Assistant Examiner* — Mandish Randhawa
(74) *Attorney, Agent, or Firm* — Katten Muchin Rosenman LLP

(57) ABSTRACT

A gateway device according to the present art includes a storage part that stores a list having identification information identifying another gateway device that is selectable as a move-destination gateway device; a receiving part that receives a call-out signal from a device located in a telephone network; a move-destination-gateway-device selecting part that selects a move-destination gateway device from the list; a re-direction notification generating part that generates a re-direction notification to be transmitted to the selected move-destination gateway device; a re-direction notification transmitting part that transmits the re-direction notification to the move-destination gateway device; a re-direction request signal generating part that generates a re-direction request signal including call identification information identifying the call-out signal; and a re-direction request signal transmitting part that transmits the re-direction request signal to the device located in the telephone network that transmits the call-out signal.

6 Claims, 21 Drawing Sheets

| MESSAGE TYPE | : | CALL OUT |
| CALL IDENTIFICATION NUMBER | : | aaa |
| SENDING NUMBER | : | A |
| RECEIVING NUMBER | : | X |
| . . . | | |

M350

MESSAGE TYPE : RE-DIRECTION NOTIFICATION RESPONSE
CALL IDENTIFICATION NUMBER : aaa

FIG.10

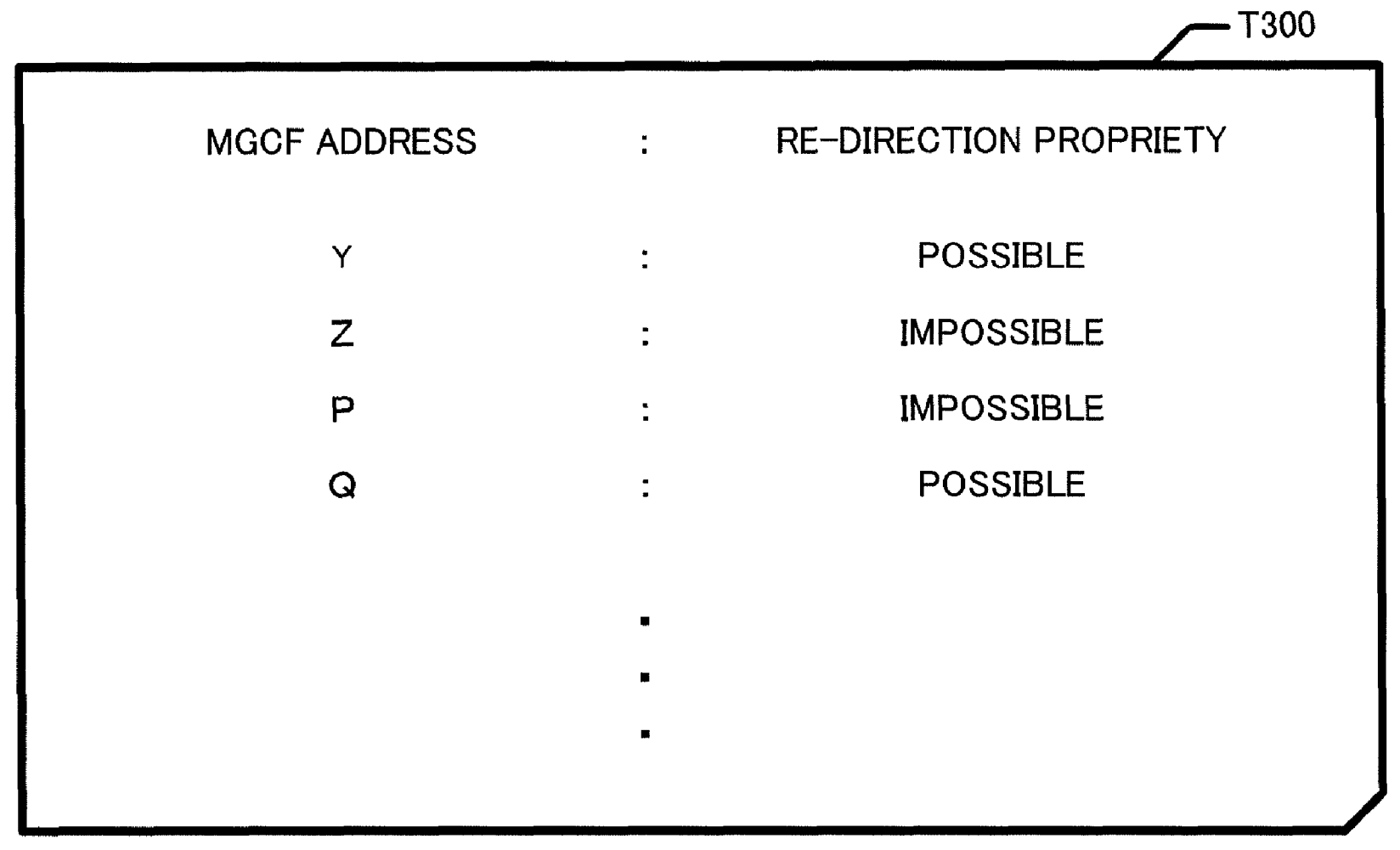

| MGCF ADDRESS | ... | RE-DIRECTION PROPRIETY |
|---|---|---|
| Y | ... | POSSIBLE |
| Z | ... | IMPOSSIBLE |
| P | ... | IMPOSSIBLE |
| Q | ... | POSSIBLE |
| ... | ... | ... |

MESSAGE TYPE             :  RE-DIRECTION

CALL IDENTIFICATION NUMBER : aaa

SENDING NUMBER           :  A

RECEIVING NUMBER         :  WW

MOVE SOURCE NUMBER       :  X
                            .
                            .
                            .
```

| MESSAGE TYPE | : | CALL OUT |
| CALL IDENTIFICATION NUMBER | : | aaa |
| SENDING NUMBER | : | A |
| RECEIVING NUMBER | : | WW |
| MOVE SOURCE NUMBER | : | X |
| . . . | | |

GATEWAY DEVICE

BACKGROUND

1. Technical Field

The present invention relates to a load distribution technique for a media gateway control function (MGCFs) in the transition from a legacy network to an Internet protocol multimedia subsystem (IMS) network. The legacy network is an existing network for providing telephone service in public switched telephone networks (PSTN).

2. Description of the Related Art

In telephone networks such as PSTN and integrated services digital networks (ISDNs), a method for bypass routing of signaling messages is a countermeasure for congestion. For example, Japanese Unexamined Patent Application Publications No. 2001-333114, No. 2003-309650, and No. 2002-290551 disclose a method for controlling calls using a traffic control system (TCS), and a bypass method in which an interface unit between an existing legacy network and an Internet protocol (IP) network notifies the legacy network of congestion to instruct that messages be routed via a bypass. In those methods, the legacy network is instructed to perform bypass routing. In the legacy network, bypass routing is taken into account and appropriate processing is performed accordingly. Therefore, legacy network carriers and IMS network carriers are different, and the above methods are not suitable if the legacy network takes no additional functionality or bypass routing into account.

In the related art, a concentration of calls in disasters, which is assumed to be a main cause of congestion, is controlled by a device for managing an entire network.

Such a control system is not suitable for an environment with coexistence of multiple carriers/domains.

Due to the existence of multiple IMS network managers including an MGCF unit (hereinafter referred to as an "MGCF") and legacy network managers including a toll switch, a large amount of time and labor is required for such managers to work together to deal with congestion. Since legacy networks are expected to be scaled down in the future, it is desirable to avoid upgrade of existing legacy network infrastructures with a large amount of investment. Further, it is not practical in view of cost to provide IMS network infrastructures in which the overall operating performance of MGCFs is too high. It is therefore desirable that each IMS network manager not invest too much in infrastructure and develop effective countermeasures for congestion without interfering with other networks.

SUMMARY

It is an object of the present invention to improve, in an environment where a considerable number of users exist in each of a legacy network and an IMS network, the performance of MGCFs in the networks as a whole.

To this end, the present invention provides the following features.

In an aspect, the present art provides a gateway device for establishing a connection between a telephone network including a re-direction function and an Internet protocol multimedia subsystem (IMS) network and transmitting a call-out signal from a device located in the telephone network to a device located in the IMS network. The gateway device includes a storage part configured to store a list having identification information for identifying at least another gateway device being selectable as a move-destination gateway device; a receiving part configured to receive a call-out signal from a device located in the telephone network, the call-out signal including receiving-device identification information and call identification information; a move-destination-gateway-device selecting part configured to select a move-destination gateway device from the list when the receiving part receives a call; a re-direction notification generating part configured to generate a re-direction notification to be transmitted to the selected move-destination gateway device, the re-direction notification including the call identification information included in the call-out signal; a re-direction notification transmitting part configured to transmit the re-direction notification to the move-destination gateway device; a re-direction request signal generating part configured to generate a re-direction request signal, the re-direction request signal including move-source-device identification information, receiving-device identification information, and the call identification information included in the call-out signal, wherein the move-source-device identification information is set to the receiving-device identification information included in the call-out signal and the receiving-device identification information is set to the identification information identifying the move-destination gateway device; and a re-direction request signal transmitting part configured to transmit the re-direction request signal to the device located in the telephone network that transmits the call-out signal.

According to the features of the present art, a gateway device can move call processing to another gateway device.

In another aspect, the present art provides a gateway device for establishing a connection between a telephone network having a re-direction function and an Internet protocol multimedia subsystem (IMS) network and transmitting a call-out signal from a device located in the telephone network to a device located in the IMS network. The gateway device includes a re-direction notification receiving part configured to receive from another gateway device a re-direction notification including call identification information included in a call-out signal received by the other gateway device; a storage part configured to store the call identification information included in the re-direction notification; a re-direction notification response generating part configured to generate a response to the re-direction notification; a re-direction notification response transmitting part configured to transmit the response to the other gateway device; a receiving part configured to receive a re-call-out signal transmitted from the telephone network in response to a re-direction request issued by the other gateway device, the re-call-out signal including move-source-device identification information and receiving-device identification information, wherein the move-source-device identification information is set to receiving-device identification information included in the call-out signal and the receiving-device identification information is set to identification information identifying the gateway device; a call processing part configured to generate, when call identification information identifying the re-call-out signal matches a call identification information item stored in the storage part, a call-out signal including receiving-device identification information that is set to the move-source-device identification information included in the re-call-out signal; and a transmitting part configured to transmit the call-out signal generated by the call processing part to a receiving device associated with receiving-device identification information included in the call-out signal.

Therefore, a gateway device can transmit a call transferred from another gateway device to a desired receiving terminal.

In still another aspect, the present art provides a gateway device for establishing a connection between a telephone network having a re-direction function and an Internet protocol multimedia subsystem (IMS) network and transmitting a call-out signal from a device located in the telephone network to a device located in the IMS network. The gateway device includes a storage part configured to store a list having special identification information items each including identification information identifying another gateway device selectable as a call move destination and indicating a bypass call; a receiving part configured to receive a call-out signal transmitted from a device located in the telephone network, the call-out signal including receiving-device identification information and call identification information; a special-identification-information selecting part configured to select one of the special identification information items in the list when the receiving part receives a call-out signal in a predetermined situation; a re-direction request signal generating part configured to generate a re-direction request signal, the re-direction request signal including receiving-device identification information and the call identification information included in the call-out signal, wherein the receiving-device identification information is set to the selected special identification information item; and a re-direction request signal transmitting part configured to transmit the re-direction request signal to the device located in the telephone network that transmits the call-out signal.

Therefore, a gateway device can move call processing to a second gateway device without notifying the second gateway device before moving the call processing to the second gateway device.

In still another aspect, the present art provides a gateway device located in an Internet protocol multimedia subsystem (IMS) network, for establishing a connection between a telephone network having a re-direction function and the IMS network and transmitting a call-out signal from a device located in the telephone network to a device located in the IMS network. The gateway device includes a storage part configured to store special identification information items each indicating that a given gateway device allows a call to be bypassed therethrough; a receiving part configured to receive a re-call-out signal transmitted from the telephone network in response to a re-direction request issued by another gateway device, the re-call-out signal including move-source-device identification information and receiving-device identification information; a call processing part configured to generate, when the receiving-device identification information included in the re-call-out signal matches one of the special identification information items stored in the storage part, a call-out signal including receiving-device identification information that is set to the move-source-device identification information included in the re-call-out signal; and a transmitting part configured to transmit the call-out signal generated by the call processing part to a receiving device associated with the receiving-device identification information included in the call-out signal.

Therefore, a gateway device can transmit a call transferred from a move-source gateway device to a desired receiving terminal without receiving a notification from the move-source gateway device in advance.

The term "gateway device" used herein includes an MGCF. The term "telephone network" used herein includes a legacy network.

According to the present art, in an environment where a considerable number of users exist in each of a legacy network and an IMS network, the performance of MGCFs can be improved in the networks as a whole.

BRIEF DESCRIPTION OF THE DRAWINGS

FIG. 2 is a diagram showing an example of information contained in a normal call-out signal according to the first embodiment;

FIG. 10 is a diagram showing an example of a list of proposed move destinations stored in the load/move destination MGCF management part of the move source MGCF according to the first embodiment;

FIG. 19 is a diagram showing an example of information contained in a re-direction signal according to the second embodiment;

FIG. 21 is a diagram showing an example of information contained in a re-call-out signal generated by a toll switch according to the second embodiment.

DESCRIPTION OF THE PREFERRED EMBODIMENTS

Embodiments of the present invention will be described hereinafter with reference to the drawings. It is to be understood that the embodiments provide illustrative examples and the present art is not limited to the embodiments.

[First Embodiment]

<Structure>

(Network Structure)

Figure 1:
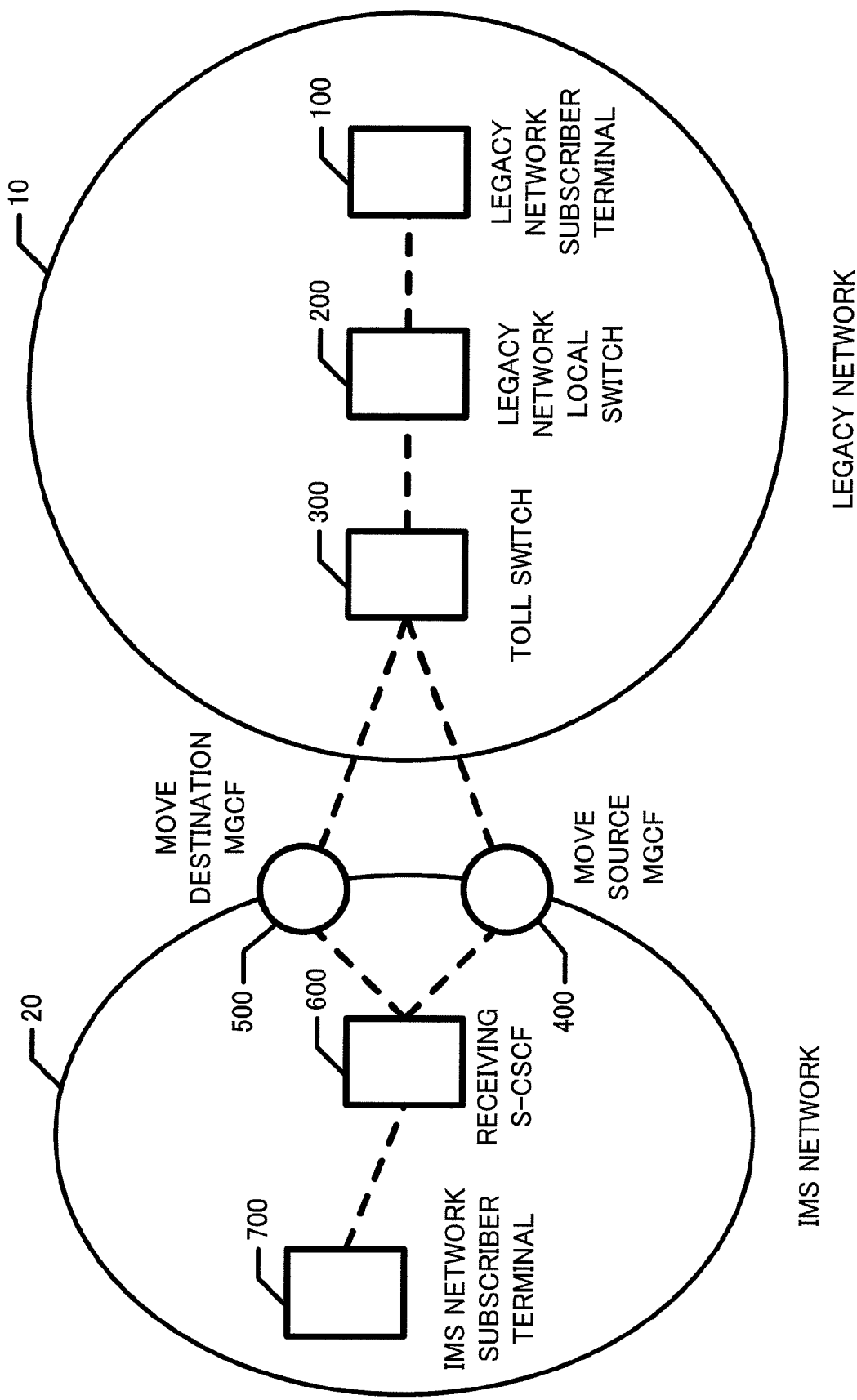
FIG. 1 is a diagram showing an example structure of a network according to a first embodiment of the present art.

FIG. 1 is a diagram showing an example structure of a network according to a first embodiment of the present art. The network according to the first embodiment is divided into a legacy network 10 and an IMS network 20. The legacy network 10 includes a legacy network subscriber terminal 100, a legacy network local switch 200, and a toll switch 300. The IMS network 20 includes a move source MGCF 400, a move destination MGCF 500, a receiving serving call session control function (S-CSCF) 600, and an IMS network subscriber terminal 700.

The move source MGCF 400 and the move destination MGCF 500 have an identical MGCF structure. That is, each MGCF has a move source function and a move destination function. In the following description, an MGCF serving as a move source is referred to as a "move source MGCF", and an MGCF serving as a move destination is referred to as a "move destination MGCF".

(Legacy Network)

The legacy network 10 includes the legacy network subscriber terminal 100, the legacy network local switch 200, and the toll switch 300.

<<Subscriber Terminal in Legacy Network>>

The legacy network subscriber terminal 100 has a function as a typical subscriber terminal in a legacy network. The legacy network subscriber terminal 100 transmits a call-out signal M100 directed to the IMS network subscriber terminal 700 to the legacy network local switch 200.

FIG. 2 is a diagram showing an example of a normal call-out signal. The normal call-out signal M100 has fields for a message type, a call identification number, a sending number, a receiving number, etc. The message type of the call-out signal M100 is a "call out". The call identification number is an identification number uniquely assigned to each call. The call identification number uniquely specifies a call. The sending number of the call-out signal M100 corresponds to an identification number of a sending unit. In FIG. 2, "A", which is the identification number of the legacy network subscriber terminal 100, is recorded as the sending number. The receiving number of the call-out signal M100 basically corresponds to an identification number of a final receiving unit. In FIG. 2, "X", which is the identification number of the IMS network subscriber terminal 700, is recorded as the receiving number. The call-out signal M100 is transmitted to the unit identified by the receiving number "X".

<<Local Switch in Legacy Network>>

The legacy network local switch 200 has a typical local switch function for handling a re-direction signal. The legacy network local switch 200 transmits the call-out signal M100 received from the legacy network subscriber terminal 100 to the toll switch 300.

<<Toll Switch>>

The toll switch 300 has a typical toll switch function for handling a re-direction signal. The toll switch 300 transmits the call-out signal M100 received from the legacy network local switch 200 to the move source MGCF 400 in the IMS network 20.

Further, upon receiving a re-direction signal M200 from the move source MGCF 400, the toll switch 300 generates a re-call-out signal M400 from the re-direction signal M200 and the call-out signal M100 with the same call identification number as the re-direction signal M200. The toll switch 300 transmits the re-call-out signal M400 to the move destination MGCF 500.

Figure 3:
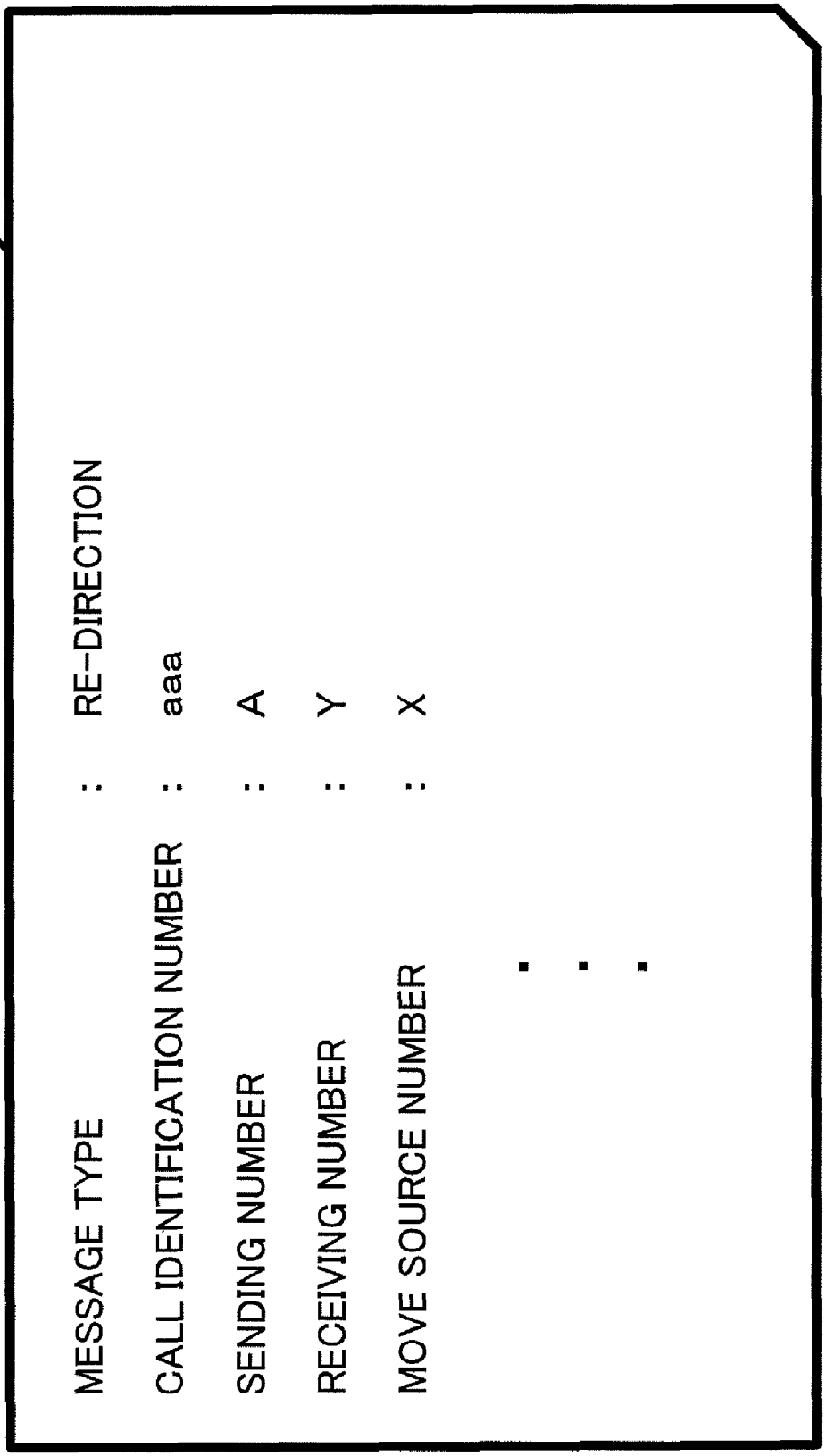
FIG. 3 is a diagram showing an example of information contained in a re-direction signal according to the first embodiment.

FIG. 3 is a diagram showing an example of a re-direction signal. The re-direction signal M200 has fields for a message type, a call identification number, a sending number, a receiving number, a move source number, etc. The message type of the re-direction signal M200 is a "re-direct". The same number as the call identification number of the call to be re-directed is recorded as the call identification number of the re-direction signal M200. The sending number of the re-direction signal M200 corresponds to an identification number of a unit that originates the call. In FIG. 3, "A", which is the identification number of the legacy network subscriber terminal 100 that originates the call, is recorded as the sending number. The receiving number of the re-direction signal M200 corresponds to an identification number of a move destination MGCF. In FIG. 3, "Y", which the identification number of the move destination MGCF 500, is recorded as the receiving number. The move source number of the re-direction signal corresponds to the receiving number of the original call-out signal M100. In FIG. 3, "X", which is the receiving number of the original call out signal M100, is recorded as the move source number.

Figure 4:
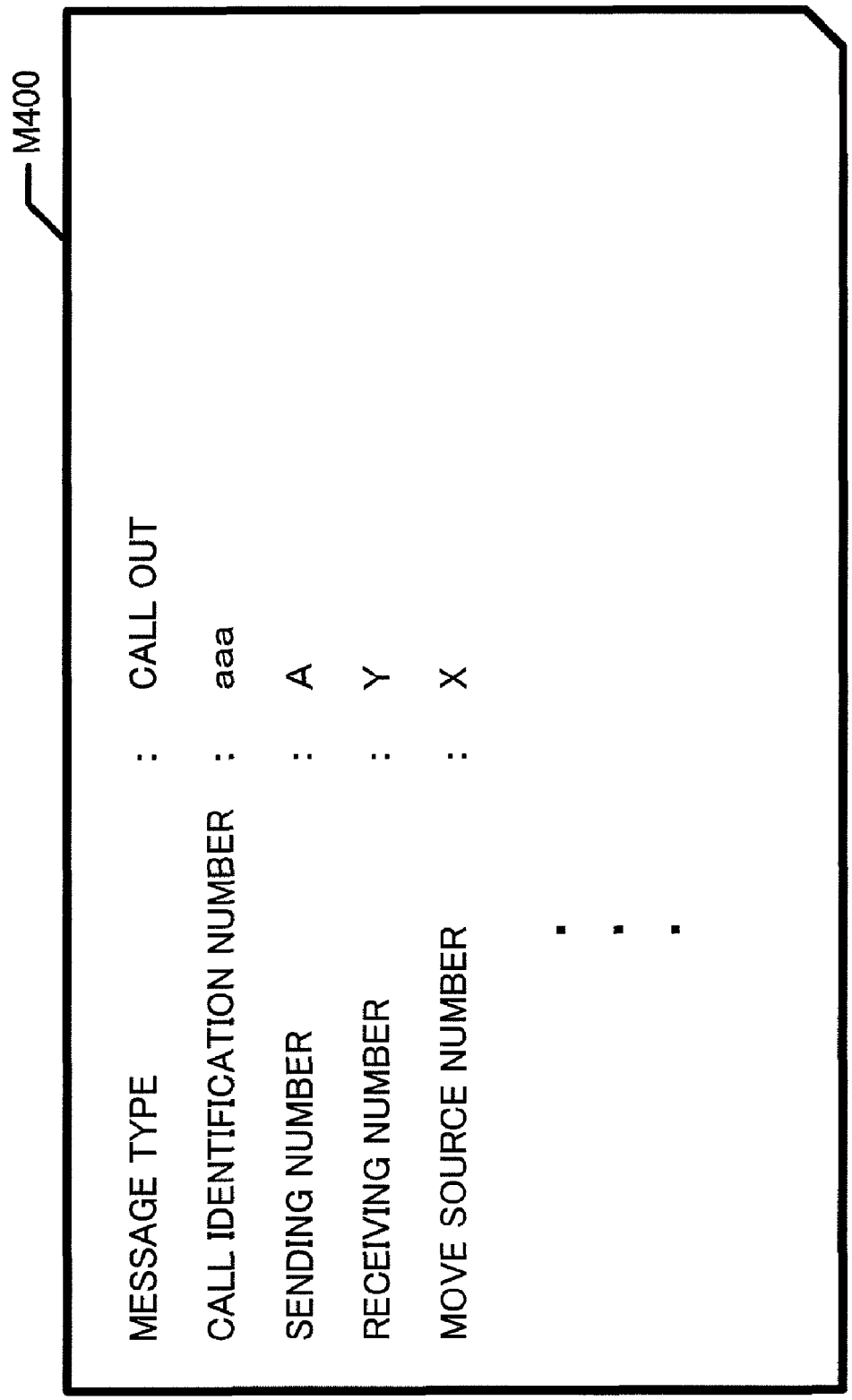
FIG. 4 is a diagram showing an example of information contained in a re-call-out signal generated by a toll switch according to the first embodiment.

FIG. 4 is a diagram showing an example of a re-call-out signal. The re-call-out signal M400 has fields for a message type, a call identification number, a sending number, a receiving number, a move source number, etc. The re-call-out signal M400 is generated by the toll switch 300. The message type of the re-call-out signal M400 is a "call out". The re-call-out signal M400 is basically handled in a manner similar to that of a normal call-out signal, and has the same message type as the call-out signal M100. The call identification number of the re-call-out signal M400 corresponds to a call identification number of a call to be re-directed. The sending number of the re-call-out signal M400 corresponds to the sending number of the original call-out signal M100. The receiving number of the re-call-out signal M400 corresponds to an identification number of a move destination MGCF. The receiving number of the re-call-out signal M400 is the same as the receiving number of the re-direction signal M200. The identification number of a move destination MGCF is written in the receiving number of the re-call-out signal M400, thereby routing the call through the move destination MGCF 500. The move source number of the re-call-out signal M400 is the same as the move source number of the re-direction signal M200, and corresponds to the receiving number of the call-out signal M100 (the identification number of the final receiving unit).

A re-call-out signal is generated by changing the receiving number of the original call-out signal to a different number according to a request based on a re-direction signal, thereby transmitting the original call-out signal to a number different from the receiving number of the original call-out signal. A re-direction signal is generated for a call to be routed for some reasons to a number different from a receiving number specified by the original call out. Therefore, a call from a calling terminal can be routed to a receiving number specified by a re-direction signal without disconnecting the call. This function is referred to as a re-direction function.

(IMS Network)

The IMS network 20 includes the move source MGCF 400, the move destination MGCF 500, the receiving S-CSCF 600, and the IMS network subscriber terminal 700.

<<Move Source MGCF>>

Figure 5:
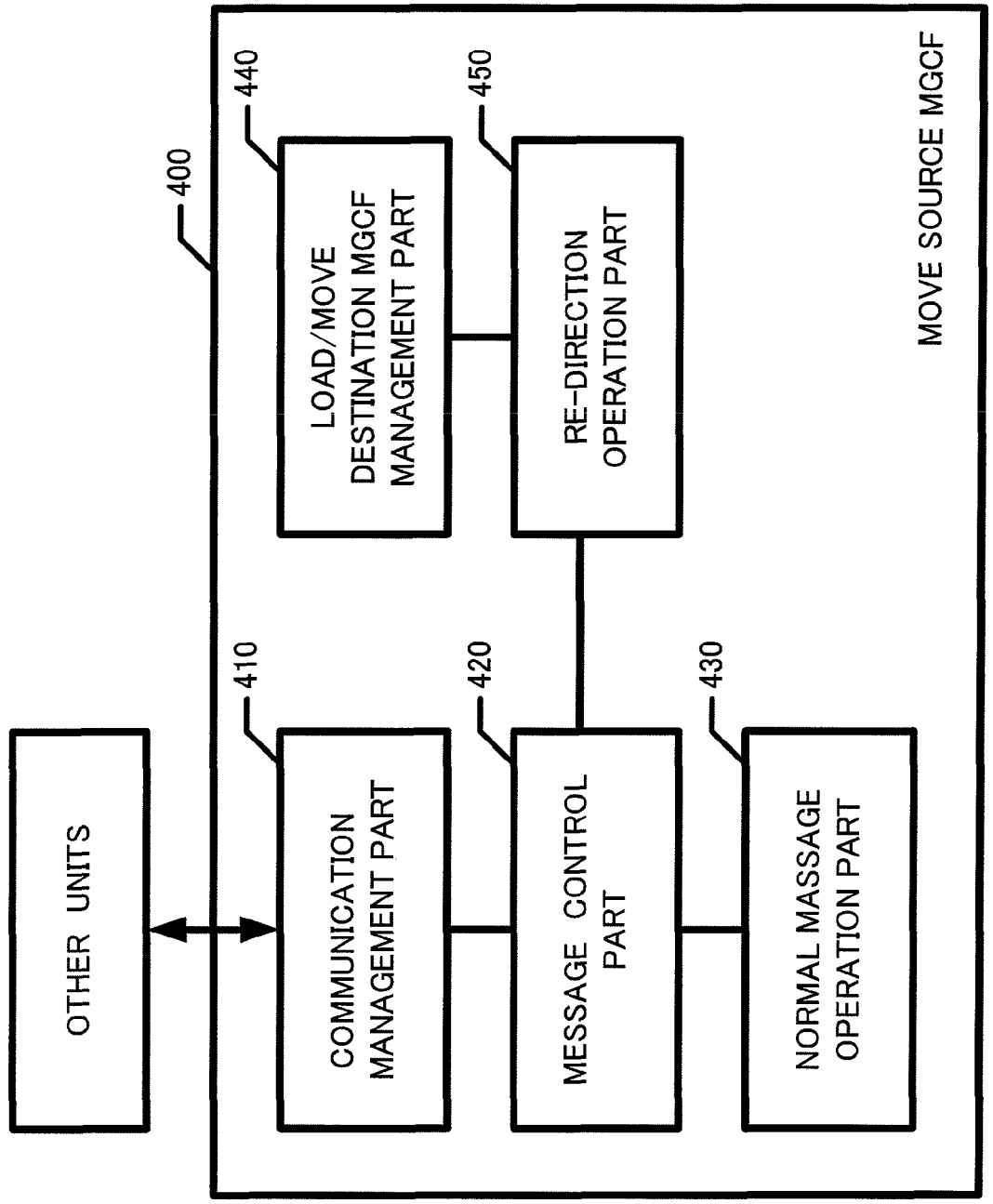
FIG. 5 is a diagram showing an example structure of a move source MGCF according to the first embodiment.

FIG. 5 is a diagram showing an example structure of the move source MGCF 400. The move source MGCF 400 includes a communication management part 410, a message control part 420, a re-direction operation part 450, a load/move destination MGCF management part 440, and a normal message operation part 430.

Upon receiving a message from another unit, the communication management part 410 passes the message to the message control part 420. Further, the communication management part 410 transmits a message passed from the message control part 420 to another unit.

The message control part 420 checks the message passed from the communication management part 410 to determine whether or not re-direction is necessary. The message control part 420 determines whether or not re-direction is necessary on the basis of re-direction necessity information T200 maintained by the message control part 420. The re-direction necessity information T200 is set in advance by the re-direction operation part 450. If it is determined that re-direction is necessary, the message control part 420 passes the message to the re-direction operation part 450. If re-direction is not necessary, the message control part 420 passes the message to the normal message operation part 430. If the message type of the message indicates a re-direction notification response message M350, the message control part 420 passes the message to the re-direction operation part 450. Further, the message control part 420 passes a message passed from the re-direction operation part 450 directly to the communication management part 410.

Figure 6:
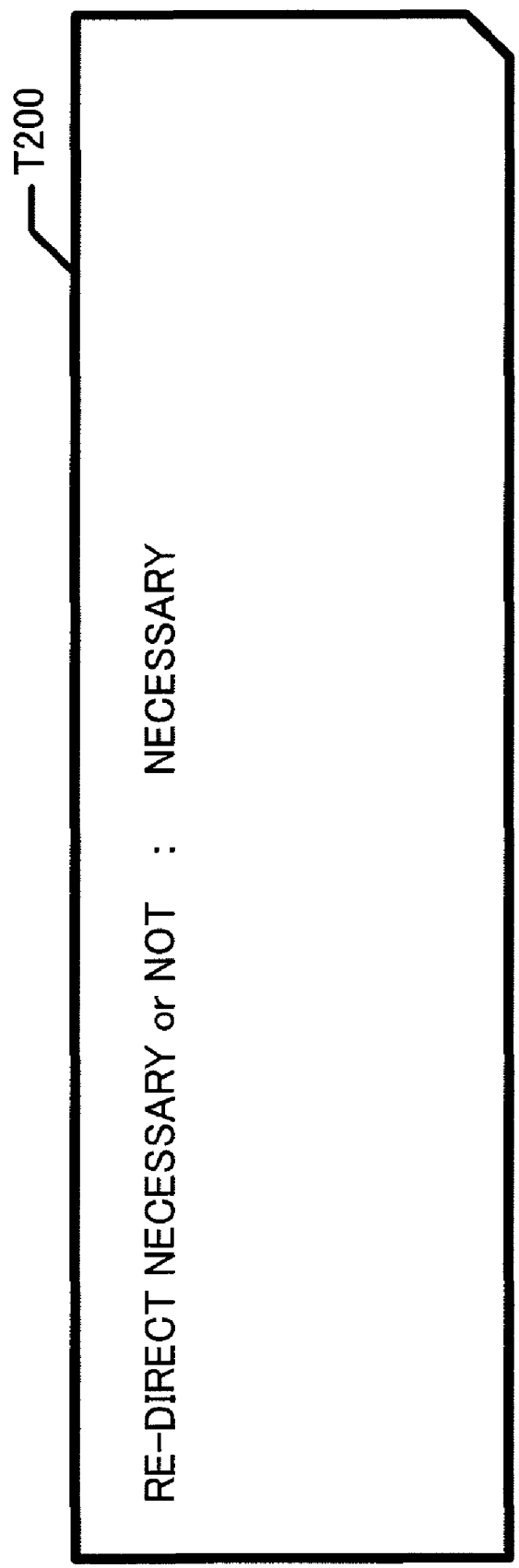
FIG. 6 is a diagram showing an example of re-direction necessity information maintained by a message control part of the move source MGCF according to the first embodiment.

FIG. 6 is a diagram showing an example of re-direction necessity information maintained by the message control part 420. The re-direction necessity information T200 has information as to whether or not re-direction is necessary. The re-direction necessity information T200 is generated on the basis of load information T100 maintained by the load/move destination MGCF management part 440.

Upon receiving a message indicating that re-direction is necessary from the message control part 420, the re-direction operation part 450 generates a re-direction notification message M300 on the basis of the data transmitted from the load/move destination MGCF management part 440, and passes the re-direction notification message M300 to the message control part 420. The re-direction operation part 450 refers to a list of proposed move destinations T300 stored in the load/move destination MGCF management part 440, and selects a move destination MGCF from among MGCFs available for re-direction.

Figure 7:
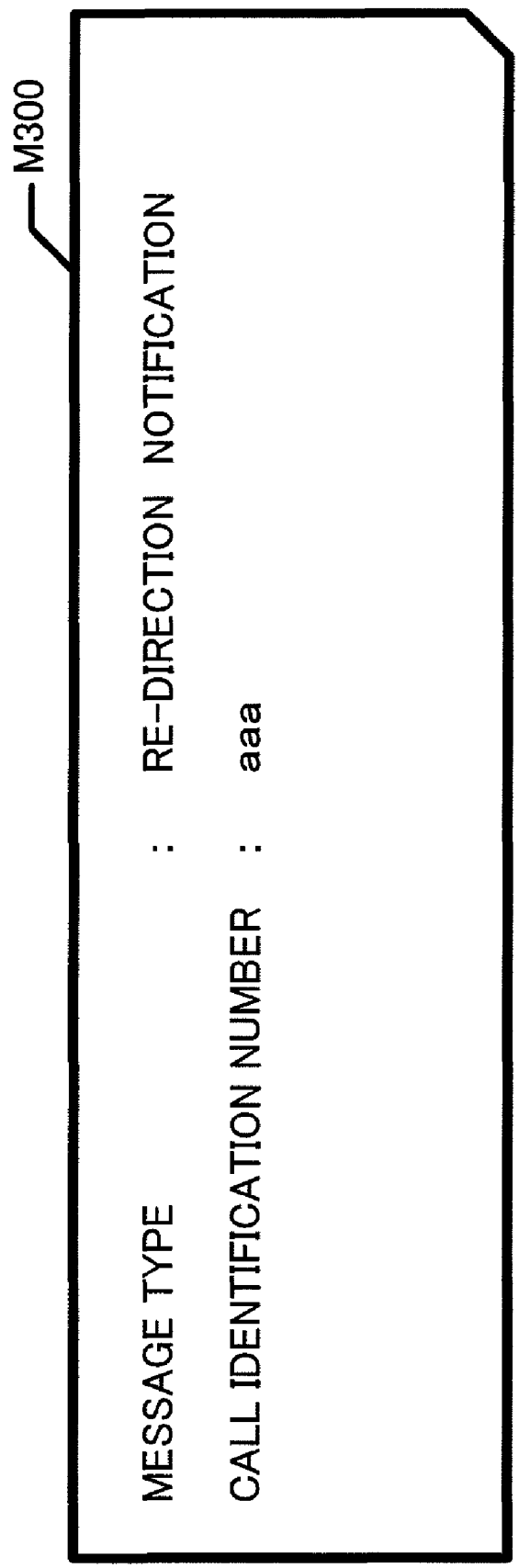
FIG. 7 is a diagram showing an example of information contained in a re-direction notification message according to the first embodiment.

FIG. 7 is a diagram showing an example of information contained in a re-direction notification message. The re-direction notification message M300 is a message for notifying the move destination MGCF 500 that the call is routed via a bypass. The re-direction notification message M300 is transmitted from the move source MGCF 400 to the move destination MGCF 500. The re-direction notification message M300 has fields for a message type, a call identification number, etc. The message type of the re-direction notification message M300 is a "re-direction notification". The call identification number of the re-direction notification message M300 corresponds to a call identification number of a call to be re-directed.

Further, upon receiving the re-direction notification response message M350 from the message control part 420, the re-direction operation part 450 generates the re-direction signal M200 on the basis of the data transmitted from the load/move destination MGCF management part 440, and passes the re-direction signal M200 to the message control part 420.

Figure 8:
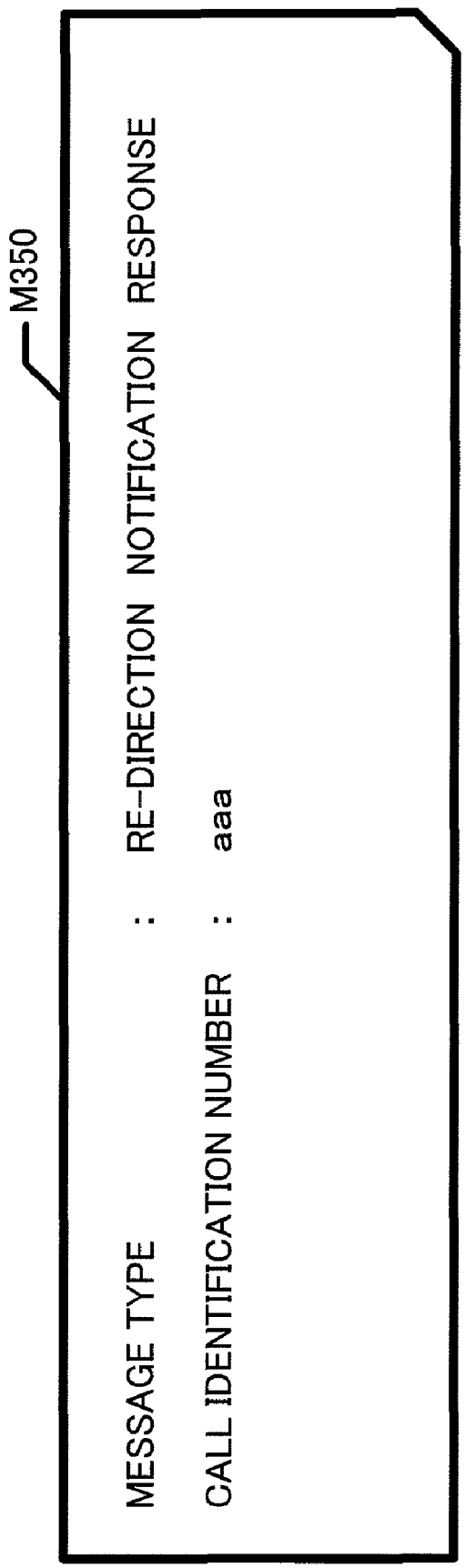
FIG. 8 is a diagram showing an example of information contained in a re-direction notification response message according to the first embodiment.

FIG. 8 is a diagram showing an example of information contained in a re-direction notification response message. The re-direction notification response message M350 is a message responsive to the re-direction notification message M300 transmitted from the move source MGCF 400 to the move destination MGCF 500. The re-direction notification response message M350 is transmitted from the move destination MGCF 500 to the move source MGCF 400. The re-direction notification response message M350 has fields for a message type, a call identification number, etc. The message type of the re-direction notification response message M350 is a "re-direction notification response". The call identification number of the re-direction notification response message M350 corresponds to a call identification number of a call to be re-directed.

The load/move destination MGCF management part 440 includes the load information T100 and the list of proposed move destinations T300 containing move destination MGCFs to be proposed when the load of the move source MGCF 400 is high.

Figure 9:
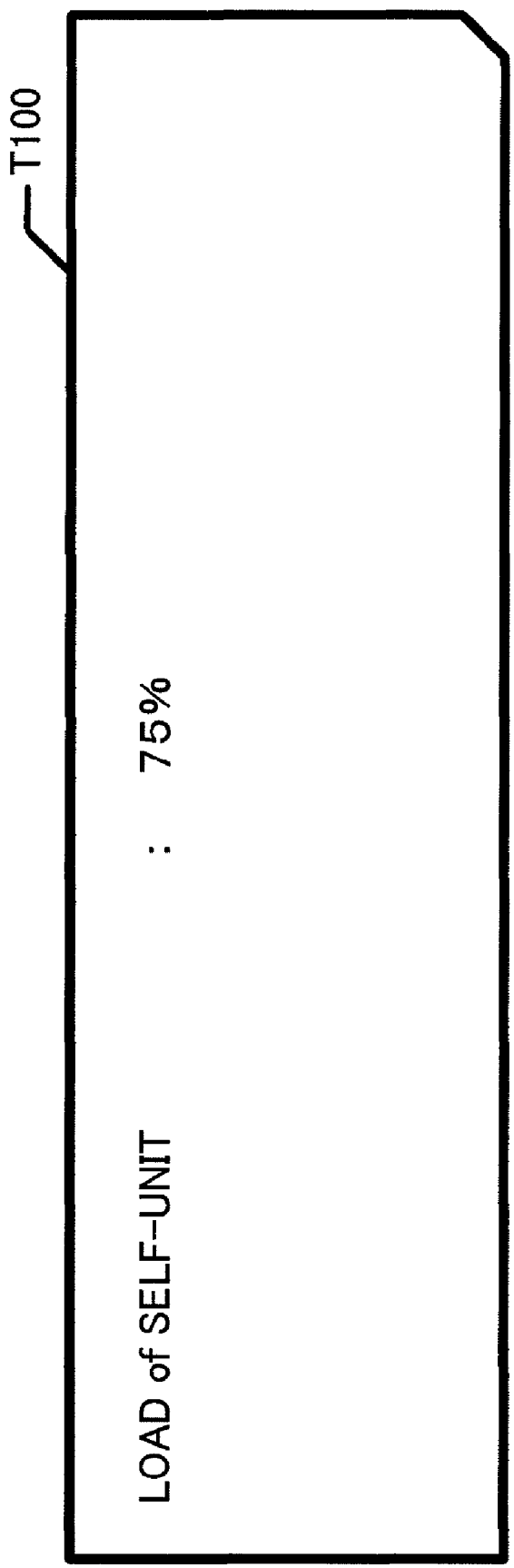
FIG. 9 is a diagram showing an example of load information stored in a load/move destination MGCF management part of the move source MGCF according to the first embodiment.

FIG. 9 is a diagram showing an example of load information stored in the load/move destination MGCF management part 440. The load information T100 contains the condition (or ratio) of the load of the move source MGCF 400 relative to, for example, a maximum possible load of an MGCF where the maximum possible load is 100%. The load information T100 is periodically updated by the load/move destination MGCF management part 440. It is assumed that, for example, a load less than 75% is set to a normal state. That is, it is assumed that the maximum load within which an MGCF can forward a call is 75%. If the load of the move source MGCF 400 designated by the load information T100 is not less than 75%, the re-direction necessity information T200 indicating that re-direction is necessary is recorded. If the load of the move source MGCF 400 designated by the load information T100 is less than 75%, the re-direction necessity information T200 indicating that re-direction is not necessary is recorded. The threshold of the load of the move source MGCF 400 described above is not limited to 75%.

FIG. 10 is a diagram showing an example of a list of proposed move destinations maintained by the load/move destination MGCF management part 440. The list of proposed move destinations T300 contains addresses of MGCFs that is selectable as move destination MGCFs, and states indicating whether or not the MGCFs are available for re-direction processing.

Upon receiving the message from the message control part 420, the normal message operation part 430 performs a message operation of the case where a call is not re-directed.

The load information T100, the re-direction necessity information T200, the list of proposed move destinations T300, etc., may be stored in a storage part provided in the move source MGCF 400 or a storage unit provided outside the move source MGCF 400.

<<Move Destination MGCF>>

Figure 11:
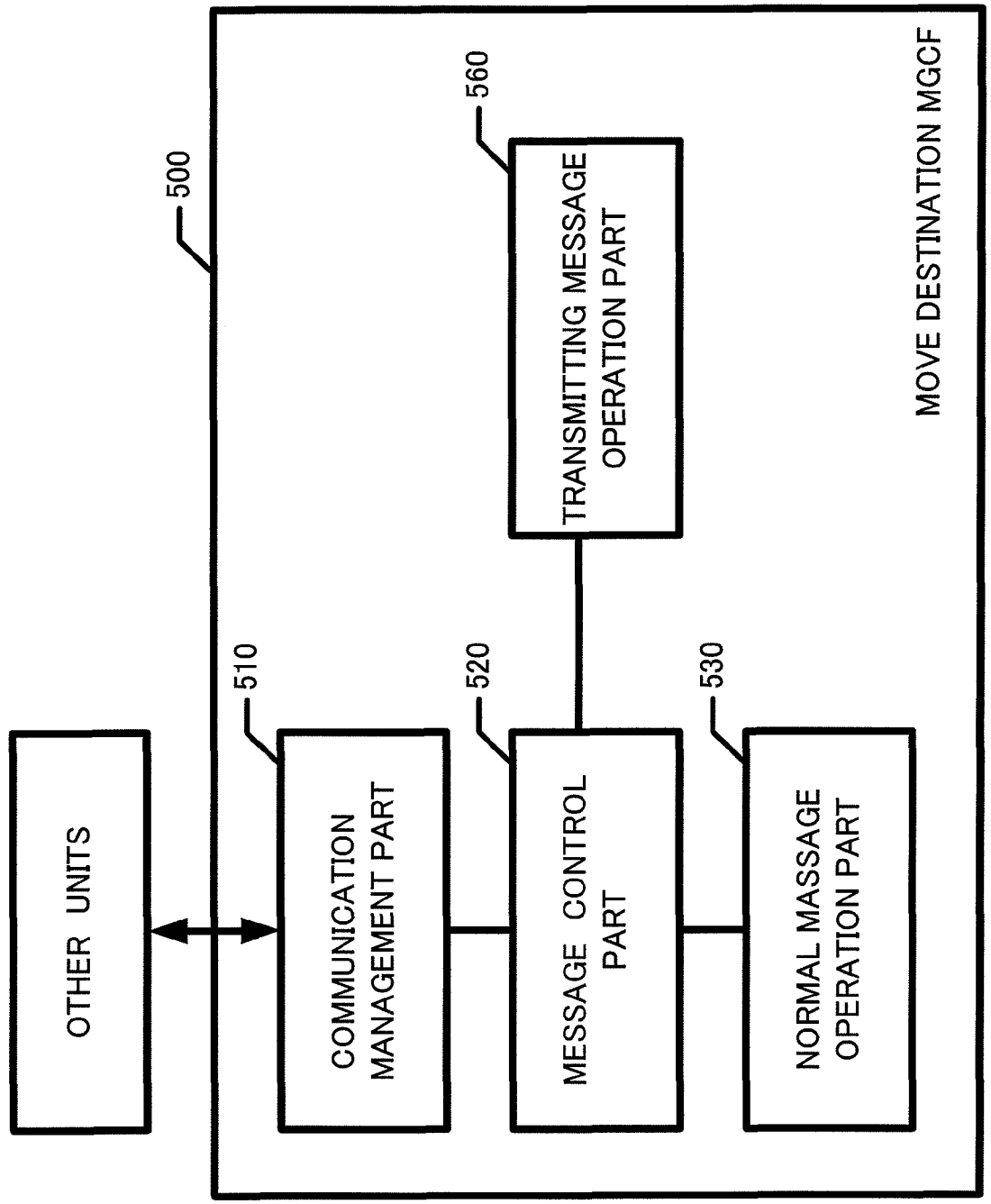
FIG. 11 is a diagram showing an example structure of a move destination MGCF according to the first embodiment.

FIG. 11 is a diagram showing an example structure of the move destination MGCF 500. The move destination MGCF 500 includes a communication management part 510, a message control part 520, a transmitting message operation part 560, and a normal message operation part 530.

The communication management part 510 receives a message from another unit, and passes the message to the message control part 520. The communication management part 510 transmits a message passed from the message control part 520 to another unit.

The message control part 520 determines whether or not the message passed from the communication management part 510 is the re-direction notification message M300. If the message is not the re-direction notification message M300, the message control part 520 determines whether or not the message is a call bypassed by re-direction. The determination as to whether or not the message is a bypassed call is performed using data configured upon receipt of the re-direction notification message M300. If the message is a bypassed call, the message control part 520 passes the message to the transmitting message operation part 560. If the message is the re-direction notification message M300, the message control part 520 maintains the call identification number of the message in a list of call identification numbers T400. The message control part 520 passes a message passed from the transmitting message operation part 560 directly to the communication management part 510.

Figure 12:
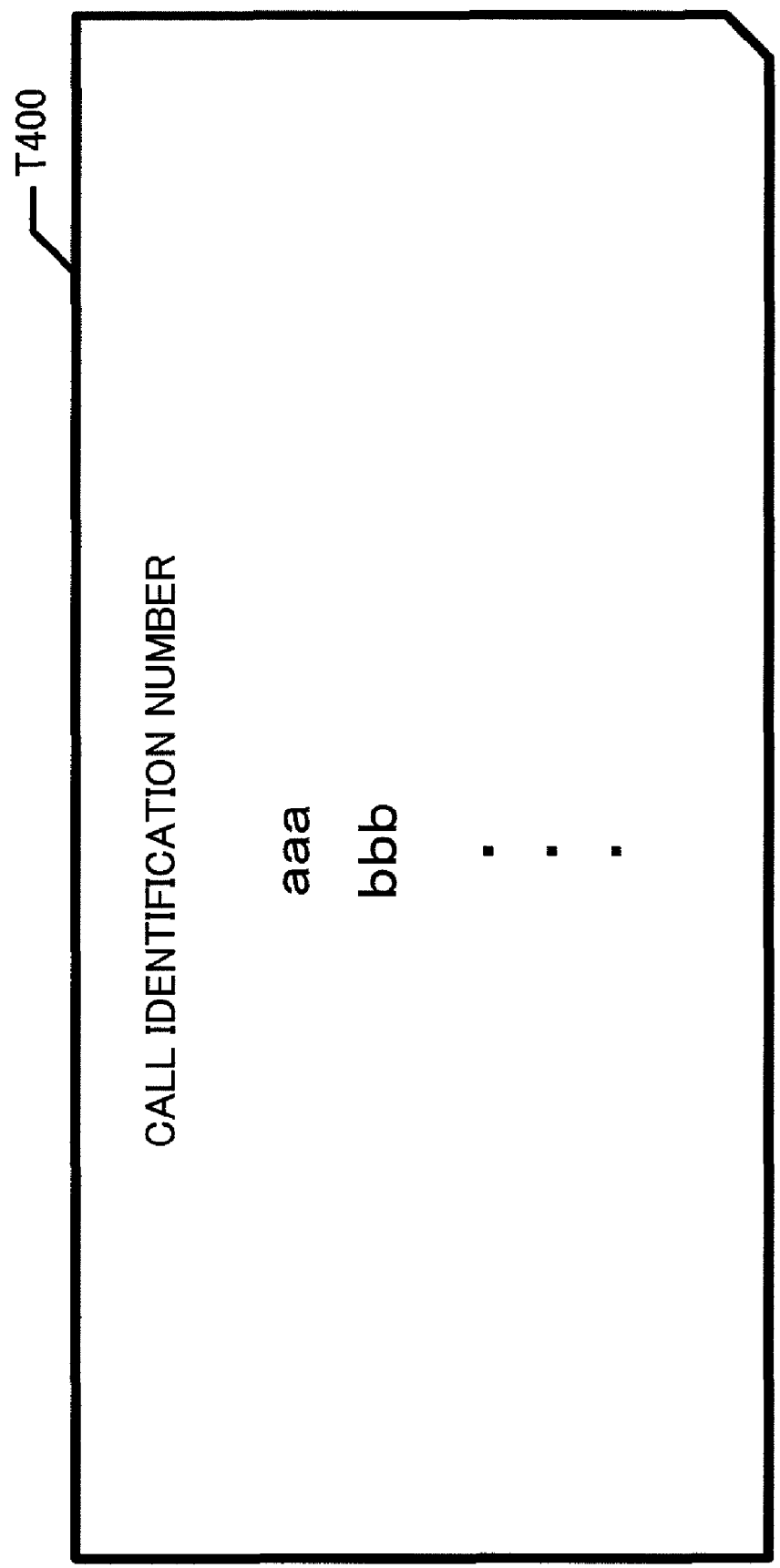
FIG. 12 is a diagram showing an example of a list of call identification numbers maintained by a message control part of the move destination MGCF according to the first embodiment.

FIG. 12 is a diagram showing an example of a list of call identification numbers maintained by the message control part 520. The list of call identification numbers T400 stores the call identification number notified through the re-direction notification message M300.

Upon receiving a message from the message control part 520, the transmitting message operation part 560 generates a message whose move source number is reset to the receiving number. The transmitting message operation part 560 returns the newly generated message to the message control part 520. The message is similar to the normal call-out signal M100 transmitted from the legacy network subscriber terminal 100.

Upon receiving the message from the message control part 520, the normal message operation part 530 performs a message operation of the case where a call is not re-directed.

The list of call identification numbers T400, etc., may be stored in a storage part provided in the move destination MGCF 500 or a storage unit provided outside the move destination MGCF 500.

<<Receiving S-CSCF>>

The receiving S-CSCF 600 has a function as a typical receiving S-CSCF. The receiving S-CSCF 600 needs to receive a call sent from any source. If the receiving S-CSCF 600 is only allowed to receive a call sent from a specific unit, it is difficult to transmit a bypassed call. The receiving S-CSCF 600 transmits a call-out signal received from the move destination MGCF 500 to the IMS network subscriber terminal 700.

<<Subscriber Terminal in IMS Network>>

The IMS network subscriber terminal 700 has a function as a typical subscriber terminal in an IMS network. The IMS network subscriber terminal 700 receives a call-out signal from the receiving S-CSCF 600.

<Example Operation>

(Bypass Routing Sequence)

Figure 13:
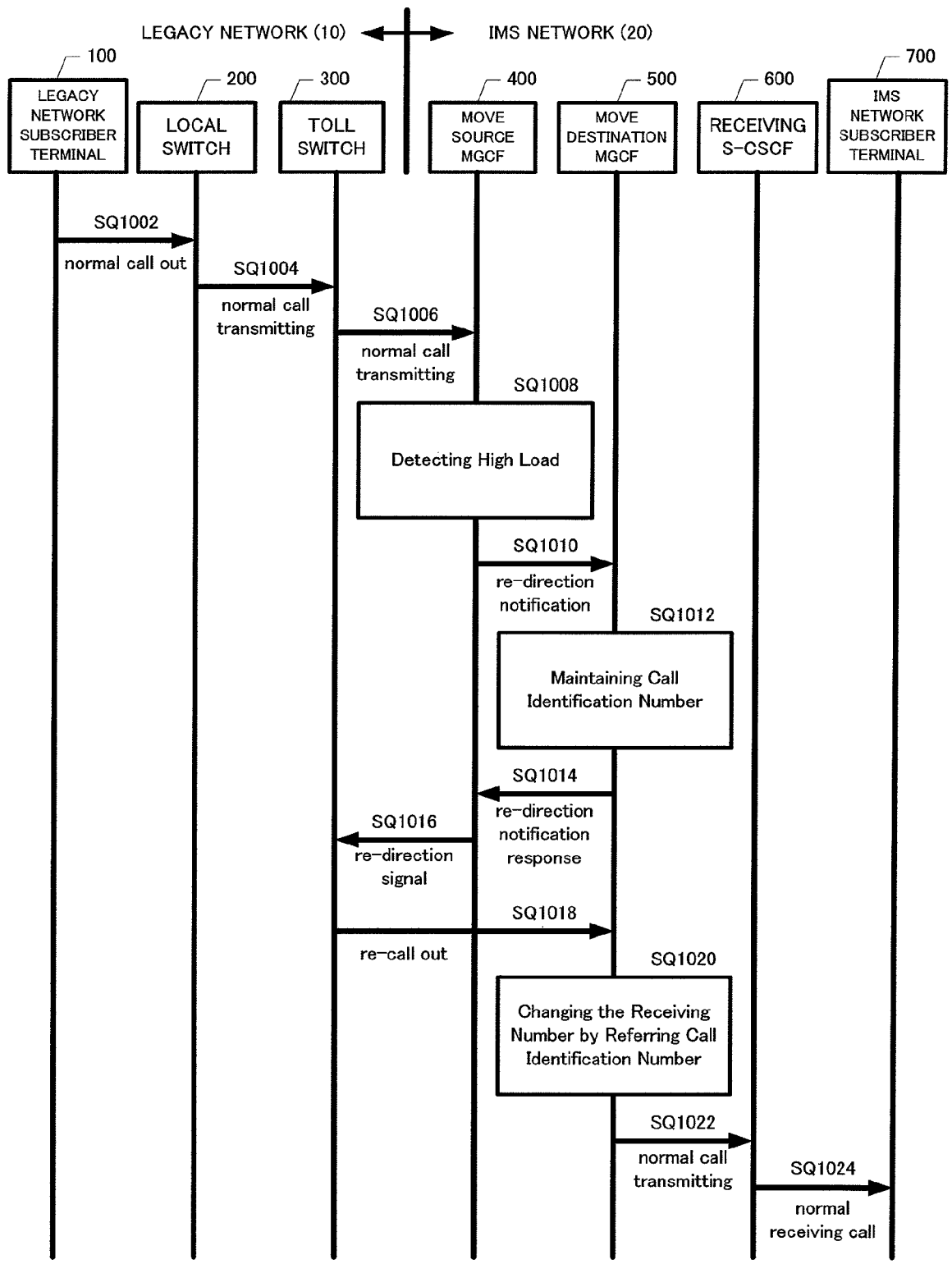
FIG. 13 is a diagram showing an example of a bypass routing sequence according to the first embodiment.

FIG. 13 is a diagram showing a sequence for allowing a move destination MGCF to identify information concerning a call to be re-directed on the basis of a re-direction notification message.

The legacy network subscriber terminal 100 in the legacy network 10 makes a normal call-out signal to the IMS network subscriber terminal 700 (SQ1002). As shown in FIG. 2, the call-out signal M100 from the legacy network subscriber terminal 100 includes the call identification number "aaa", which is an identification number for uniquely identifying the call, the sending number "A", which is the identification number of the legacy network subscriber terminal 100, and the receiving number "X", which is the identification number of the IMS network subscriber terminal 700.

The legacy network local switch 200 transmits the normal call-out signal M100 received from the legacy network subscriber terminal 100 to the toll switch 300 (SQ1004).

The toll switch 300 transmits the call-out signal M100 received from the legacy network subscriber terminal 100 to the move source MGCF 400 in the IMS network 20 (SQ1006).

Upon receiving the call-out signal M100 from the toll switch 300, the move source MGCF 400 in the IMS network 20 checks its load, and detects that the load is high (SQ1008). That is, the move source MGCF 400 checks the re-direction necessity information T200 maintained by the message control part 420.

Then, the move source MGCF 400 detects that its load is high on the basis of the re-direction necessity information T200 indicating that re-direction is "necessary". That is, due to its high load, the move source MGCF 400 is not currently available to transmit the call-out signal M100 transferred from the toll switch 300.

Therefore, the move source MGCF 400 refers to the list of proposed move destinations T300 maintained by the load/move destination MGCF management part 440, and selects the move destination MGCF 500 as an alternative MGCF. The move source MGCF 400 transmits the re-direction notification message M300 to the selected move destination MGCF 500 (SQ1010). As shown in FIG. 7, the re-direction notification message M300 includes the call identification number "aaa", which is the call identification number of the call-out signal M100.

The move destination MGCF 500 receives the re-direction notification message M300 from the move source MGCF 400. The move destination MGCF 500 records the call identification number "aaa" of the call-out signal M100 transferred to the move source MGCF 400 in the list of call identification numbers T400 (SQ1012).

The move destination MGCF 500 returns the re-direction notification response message M350 to the move source MGCF 400 (SQ1014). The re-direction notification response message M350 includes the call identification number "aaa", which is the call identification number of the call to be bypassed.

The move source MGCF 400 receives the re-direction notification response message M350 from the move destination MGCF 500. Therefore, the move source MGCF 400 confirms that the call (with the call identification number "aaa") that is not currently available to be processed by the move source MGCF 400 is processed by the move destination MGCF 500. The move source MGCF 400 returns to the originating toll switch 300 the re-direction signal M200 in which the identification number ("Y") of the move destination MGCF 500 is set as the receiving number and the initial receiving number ("X") is set as the move source number (SQ1016).

The toll switch 300 transmits the call to the move destination MGCF 500 according to a normal re-direction procedure (SQ1018). Specifically, the toll switch 300 generates the re-call-out signal M400 whose receiving number is set to the identification number ("Y") of the move destination MGCF 500 and whose move source number is set to the initial receiving number ("X"). The message type of the re-call-out signal M400 is a "call out", which is similar to that of the normal call-out signal M100. The toll switch 300 transmits the re-call out M400 to the move destination MGCF 500.

Upon receiving the re-call-out signal M400, the move destination MGCF 500 refers to the maintained list of call identification numbers T400. If the call identification number of the re-call-out signal M400 matches one of the call identification numbers in the list of call identification numbers T400, the move destination MGCF 500 determines that the call is a bypass call. The move destination MGCF 500 generates a call-out signal whose receiving number is set to the move destination number ("X") of the re-call-out signal M400 that is determined to be a bypass call (SQ1020). The move destination MGCF 500 may generate a call-out signal by updating the receiving number of the re-call-out signal M400 to "X". The move destination MGCF 500 transmits the call-out signal to the receiving S-CSCF 600 (SQ1022).

The receiving S-CSCF 600 processes the call-out signal received from the move destination MGCF 500 as a normal signaling message, and routes the resulting call to the receiving terminal, i.e., the IMS network subscriber terminal 700 (with the identification number "X") (SQ1024).

(Proposed-Move-Destination Setting Sequence 1)

Figure 14:
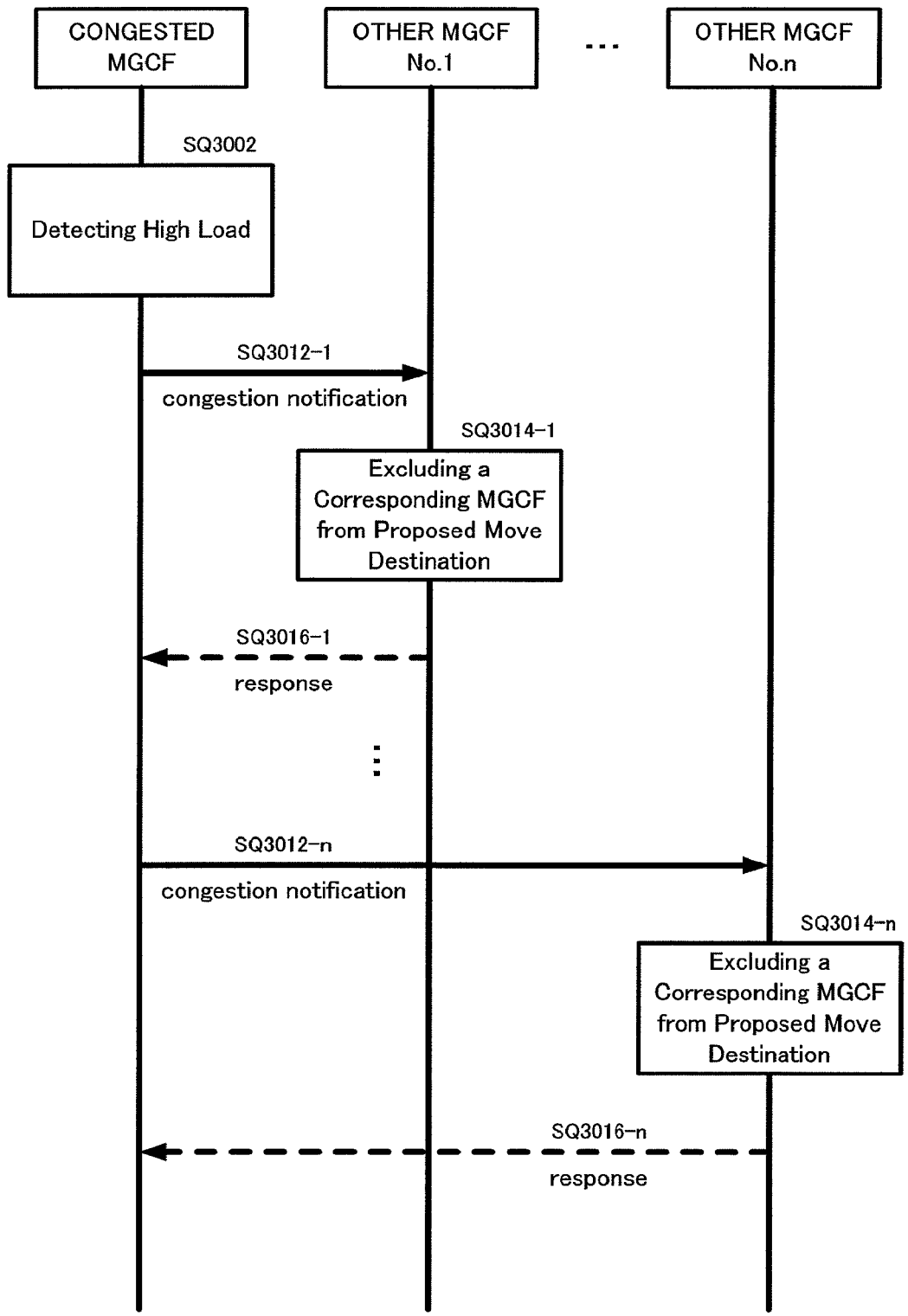
FIG. 14 is a diagram showing an example sequence (1) for setting information concerning a proposed move destination MGCF according to the first embodiment.

FIG. 14 is a diagram showing an example sequence for setting information in advance for allowing a move source MGCF to select a move destination MGCF.

The move source MGCF 400 has the list of proposed move destinations T300 stored in the load/move destination MGCF management part 440. As shown in FIG. 10, the list of proposed move destinations T300 contains possibly selectable move destination MGCFs. The possibly selectable move destination MGCFs are preferably located at places distant from the move source MGCF 400. Other MGCFs also have the list of proposed move destinations T300.

The move source MGCF 400 periodically monitors its load, and manages the load information T100 using the load/move destination MGCF management part 440. As shown in FIG. 9, the load information T100 maintains the condition (or ratio) of the load of the move source MGCF 400 relative to, for example, a maximum possible load of an MGCF when the maximum possible load is 100%. The move source MGCF 400 also maintains the re-direction necessity information T200 in the message control part 420. It is assumed that, for example, a load of an MGCF less than 75% is set to a normal state. That is, it is assumed that the maximum load within which an MGCF can forward a call is 75%. As shown in FIG. 6, for example, if the load of the move source MGCF 400 is not less than 75%, the re-direction necessity information T200 indicating that re-direction is "necessary" is recorded. If the load of the move source MGCF 400 is less than 75%, the re-direction necessity information T200 indicating that re-direction is "not necessary" is recorded.

If the load of a given MGCF is higher than the normal state, a value not less than 75% is recorded in the load of the load information T100, and the re-direction necessity information T200 indicating that re-direction is "necessary" is recorded (SQ3002). In this case, no calls are bypassed through this high-load MGCF (that is, this MGCF does not function as a move destination MGCF). Thus, the setting is changed so that the high-load MGCF is not selected as a move destination MGCF. Therefore, the high-load MGCF transmits an MGCF congestion notification message M500 to all other MGCFs having a list of proposed move destinations in which the high-load MGCF is recorded as a proposed move destination (SQ3012-1, . . . , SQ3012-n)

Figure 15:
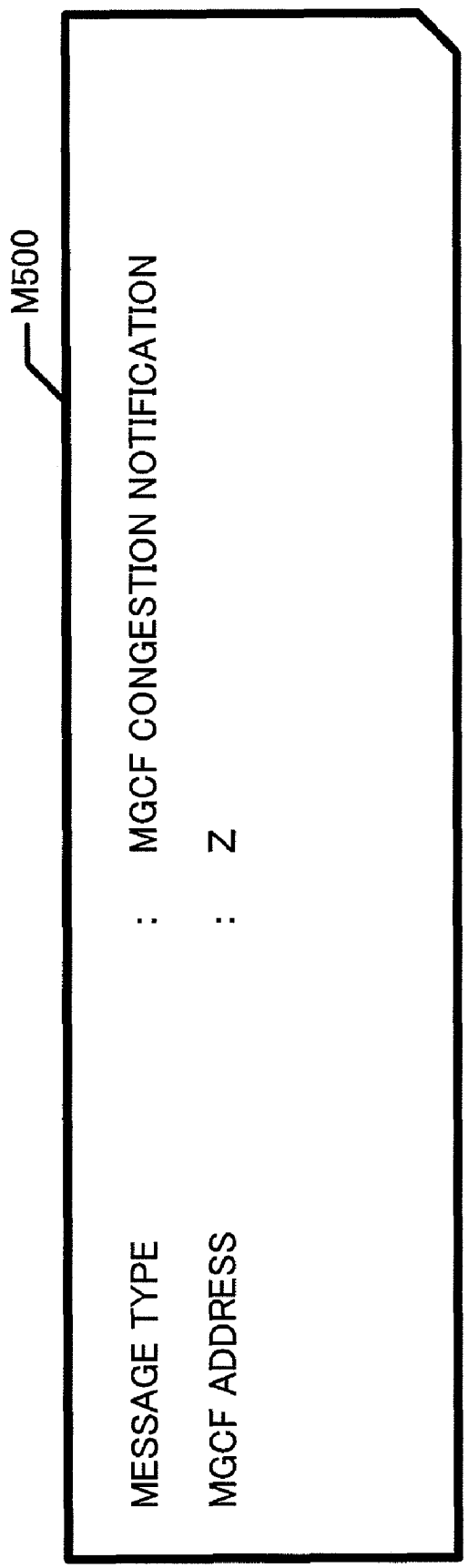
FIG. 15 is a diagram showing an example of information contained in an MGCF congestion notification message according to the first embodiment.

FIG. 15 is a diagram showing an example of information contained in an MGCF congestion notification message. The MGCF congestion notification message M500 is a message for notifying the other MGCFs that re-direction is impossible. The MGCF congestion notification message M500 includes fields for a message type, an MGCF address, etc. The message type of the MGCF congestion notification message M500 is an "MGCF congestion notification". The MGCF address of the MGCF congestion notification message M500 corresponds to the address of the MGCF that is not available for re-direction.

Upon receiving the MGCF congestion notification message M500 for notification of impossible re-direction, the other MGCFs maintain in the list of proposed move destinations T300 "impossible" information indicating that the high-load MGCF is not available for re-direction (SQ3014-1, . . . , SQ3014-n). Upon receiving the MGCF congestion notification message M500, the MGCFs return a message in response to the MGCF congestion notification message M500 (SQ3016-1, . . . , SQ3016-n).

(Proposed-Move-Destination Setting Sequence 2)

Figure 16:
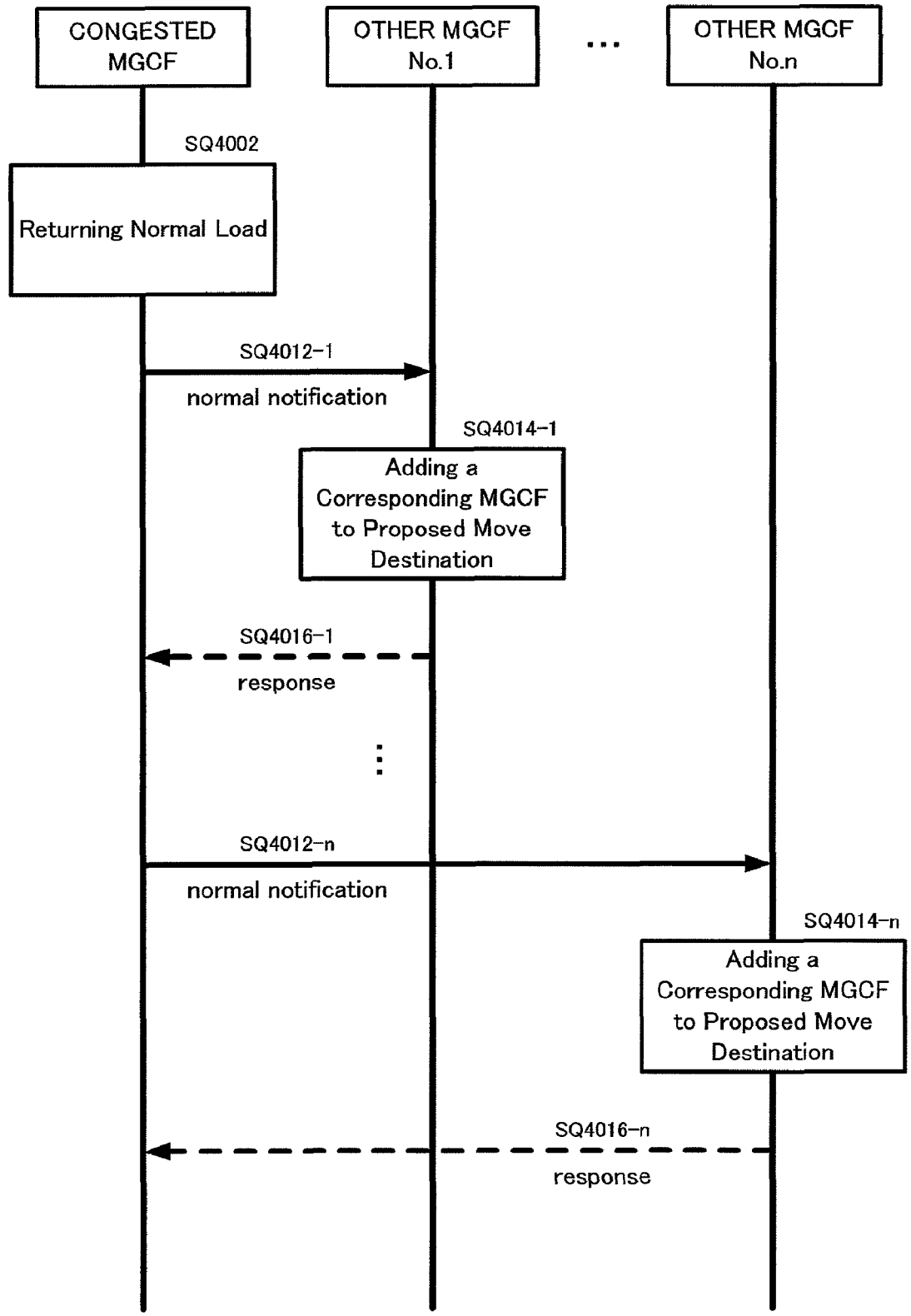
FIG. 16 is a diagram showing an example sequence (2) for setting information concerning a proposed move destination MGCF according to the first embodiment.

FIG. 16 is a diagram showing an example sequence in the case where the load of a high-load MGCF that has transmitted the MGCF congestion notification message M500 to other MGCFs is returned to the normal state.

When the load of a high-load MGCF is returned to the normal state, a value less than 75% is recorded in the load of the load information T100, and the re-direction necessity information T200 indicating that re-direction is "not necessary" is recorded (SQ4002). In this case, calls can be bypassed through this normal-load MGCF (that is, this MGCF can function as a move destination MGCF). Thus, the setting is changed so that the other MGCFs can select the normal-load MGCF as a move destination MGCF. Therefore, the normal-load MGCF transmits an MGCF normal-state notification message M600 to all the other MGCFs having a list of proposed move destinations in which the normal-load MGCF is recorded as a proposed move destination (SQ4012-1, . . . , SQ4012-n).

Figure 17:
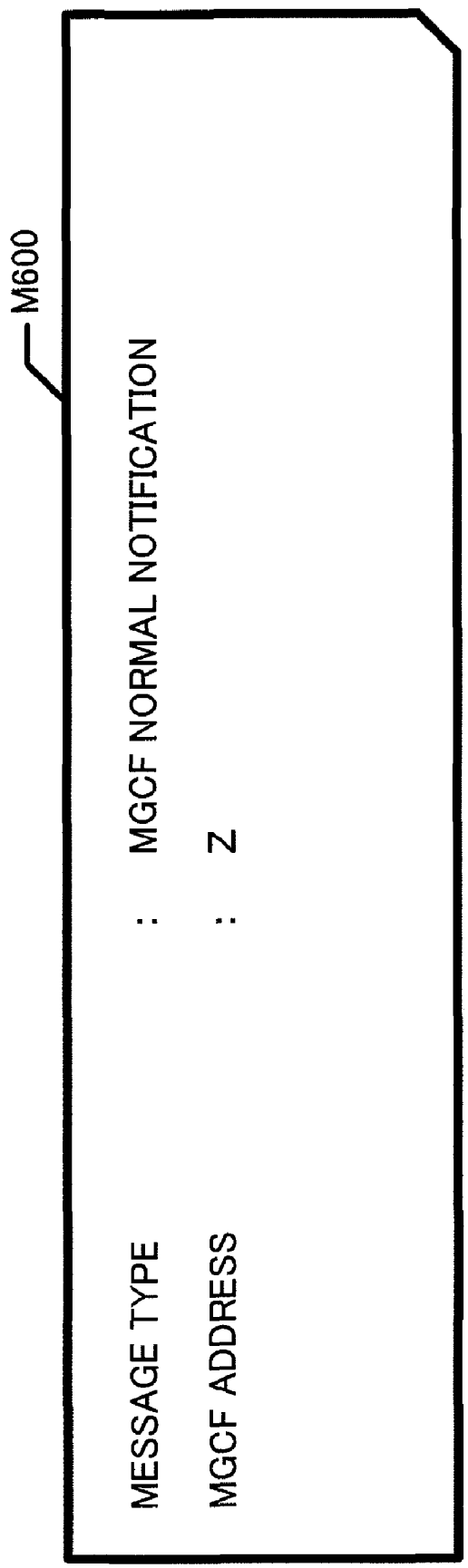
FIG. 17 is a diagram showing an example of information contained in an MGCF normal-state notification message according to the first embodiment.

FIG. 17 is a diagram showing an example of information contained in an MGCF normal-state notification message. The MGCF normal-state notification message M600 is a message for notifying the other MGCFs that re-direction is possible. The MGCF normal-state notification message M600 includes fields for a message type, an MGCF address, etc. The message type of the MGCF normal-state notification message M600 is an "MGCF normal notification". The MGCF address of the MGCF normal-state notification message M600 corresponds to the address of the MGCF that is available for re-direction.

Upon receiving the MGCF normal-state notification message M600 for notification of possible re-direction, the other MGCFs maintain in the list of proposed move destinations T300 "possible" information indicating that the MGCF whose load is returned to the normal state is available for re-direction (SQ4014-1, . . . , SQ4014-n). Upon receiving the MGCF normal-state notification message M600, the MGCFs return a message in response to the MGCF normal-state notification message M600 (SQ4016-1, . . . , SQ4016-n).

In the sequence described above, since proposed move destination MGCFs are set in advance in each MGCF, the necessity to search for a move destination MGCF is eliminated after the load of the MGCF becomes high.

According to the first embodiment, when a given MGCF is not available for call processing due to its high load, the high-load MGCF, i.e., a move source MGCF, notifies a move destination MGCF that the call is bypassed through the move destination MGCF, and instructs a toll switch to transmit the call to the move destination MGCF. The toll switch transmits the call, which is once transmitted to the move source MGCF, to the move destination MGCF according to the normal re-direction processing. The move destination MGCF transmits the call received from the toll switch to the final receiving terminal.

According to the first embodiment, the move destination MGCF is notified in advance by the move source MGCF that the call is bypassed through the move destination MGCF. Therefore, when the call is transmitted from the toll switch, the move destination MGCF can correctly transmit the call to the desired receiving terminal.

According to the first embodiment, furthermore, each MGCF stores in advance a list of proposed move destination MGCFs that are selectable as move destination MGCFs to which a call is routed in case of impossible call processing. Therefore, in the case of high load, the call can be quickly routed via a bypass.

[Second Embodiment]

<Structure>

(Network Structure)

A network structure according to a second embodiment of the present art is similar to that of the first embodiment shown in FIG. 1. That is, the network according to the second embodiment is divided into a legacy network 10 and an IMS network 20. The legacy network 10 includes a legacy network subscriber terminal 100, a legacy network local switch 200, and a toll switch 300. The IMS network 20 includes a move source MGCF 400, a move destination MGCF 500, a receiving S-CSCF 600, and an IMS network subscriber terminal 700.

(Legacy Network)

As with the legacy network 10 of the first embodiment, the legacy network 10 of the second embodiment includes the legacy network subscriber terminal 100, the legacy network local switch 200, and the toll switch 300.

The units located in the legacy network 10 have a structure similar to that of the first embodiment.

(IMS Network)

As with the IMS network 20 of the first embodiment, the IMS network 20 of the second embodiment includes the move source MGCF 400, the move destination MGCF 500, the receiving S-CSCF 600, and the IMS network subscriber terminal 700.

The receiving S-CSCF 600 and IMS network subscriber terminal 700 in the IMS network 20 of the second embodiment have a structure similar to that of the corresponding units of the first embodiment. However, the move source MGCF 400 and move destination MGCF 500 of the second embodiment have a different functional structure from that of the move source MGCF 400 and move destination MGCF 500 of the first embodiment.

<<Move Source MGCF>>

The move source MGCF 400 of the second embodiment has functional blocks similar to those of the move source MGCF 400 of the first embodiment shown in FIG. 5. That is, the move source MGCF 400 of the second embodiment includes a communication management part 410, a message control part 420, a re-direction operation part 440, a load/move destination MGCF management part 450, and a normal message operation part 430.

Upon receiving a message from another unit, the communication management part 410 passes the message to the message control part 420. Further, the communication management part 410 transmits a message passed from the message control part 420 to another unit.

The message control part 420 checks the message passed from the communication management part 410 to determine whether or not re-direction is necessary. The message control part 420 determines whether or not re-direction is necessary on the basis of re-direction necessity information T200 maintained by the message control part 420. The re-direction necessity information T200 is set in advance by the re-direction operation part 450. If it is determined that re-direction is necessary, the message control part 420 passes the message to the re-direction operation part 450. If re-direction is not necessary, the message control part 420 passes the message to the normal message operation part 430. Further, the message control part 420 passes a message passed from the re-direction operation part 450 directly to the communication management part 410.

As in the first embodiment, the message control part 420 maintains the re-direction necessity information T200 shown in FIG. 6.

Upon receiving a message indicating that re-direction is necessary from the message control part 420, the re-direction operation part 450 generates a re-direction signal M700 on the basis of the data transmitted from the load/move destination MGCF management part 440, and passes the re-direction signal M700 to the message control part 420.

FIG. 19 is a diagram showing an example of a re-direction signal according to the second embodiment. The re-direction signal M700 has fields for a message type, a call identification number, a sending number, a receiving number, a move source number, etc. The message type of the re-direction signal M700 is a "re-direct". The same as the call identification number of the call to be re-directed is recorded as the call identification number of the re-direction signal M700. The sending number of the re-direction signal M700 corresponds to an identification number of a unit that originates the call. In FIG. 19, "A", which is the identification number of the legacy network subscriber terminal 100 that originates the call, is recorded as the sending number. The move source number of the re-direction signal M700 corresponds to the receiving number of the original call-out signal M100. In FIG. 19, "X", which is the receiving number of the original call-out signal M100, is recorded as the move source number. Unlike the first embodiment, the receiving number of the re-direction signal M700 contains a special number "WW". The special number "WW" is a special number including the identification information identifying the move destination MGCF 500 and information indicating a bypass call.

The special number is a special number for notifying the move destination MGCF 500 of a bypass call. This special number needs to be (1) a number that is not allocated to any other unit and that is within a range that allows a call to reach a desired move destination MGCF on the basis of routing information on the legacy side, and (2) a number that allows a move destination MGCF, upon receiving the special number, to identify that the call can be re-transmitted by changing the number without being routed. The special number can include information for identifying a desired move destination MGCF, and information indicating that the call is a bypass call. For example, upon receiving a call having the special number written in the receiving number, an MGCF can refer to the receiving number of the call to recognize that the call is a bypass call. The special number can also include information indicating any other function.

The load/move destination MGCF management part 440 includes load information T100 and a list of special numbers T500. The list of special numbers T500 is used when the load of the move source MGCF 400 is high. The load information T100 stored in the load/move destination MGCF management part 440 is similar to that in the first embodiment shown in FIG. 9.

The load information T100 is periodically updated by the load/move destination MGCF management part 440. For example, when the load in the load information T100 is not less than 75%, the re-direction necessity information T200 indicating that re-direction is necessary is recorded. When the load in the load information T100 is less than 75%, the re-direction necessity information T200 indicating that re-direction is not necessary is recorded.

Figure 20:
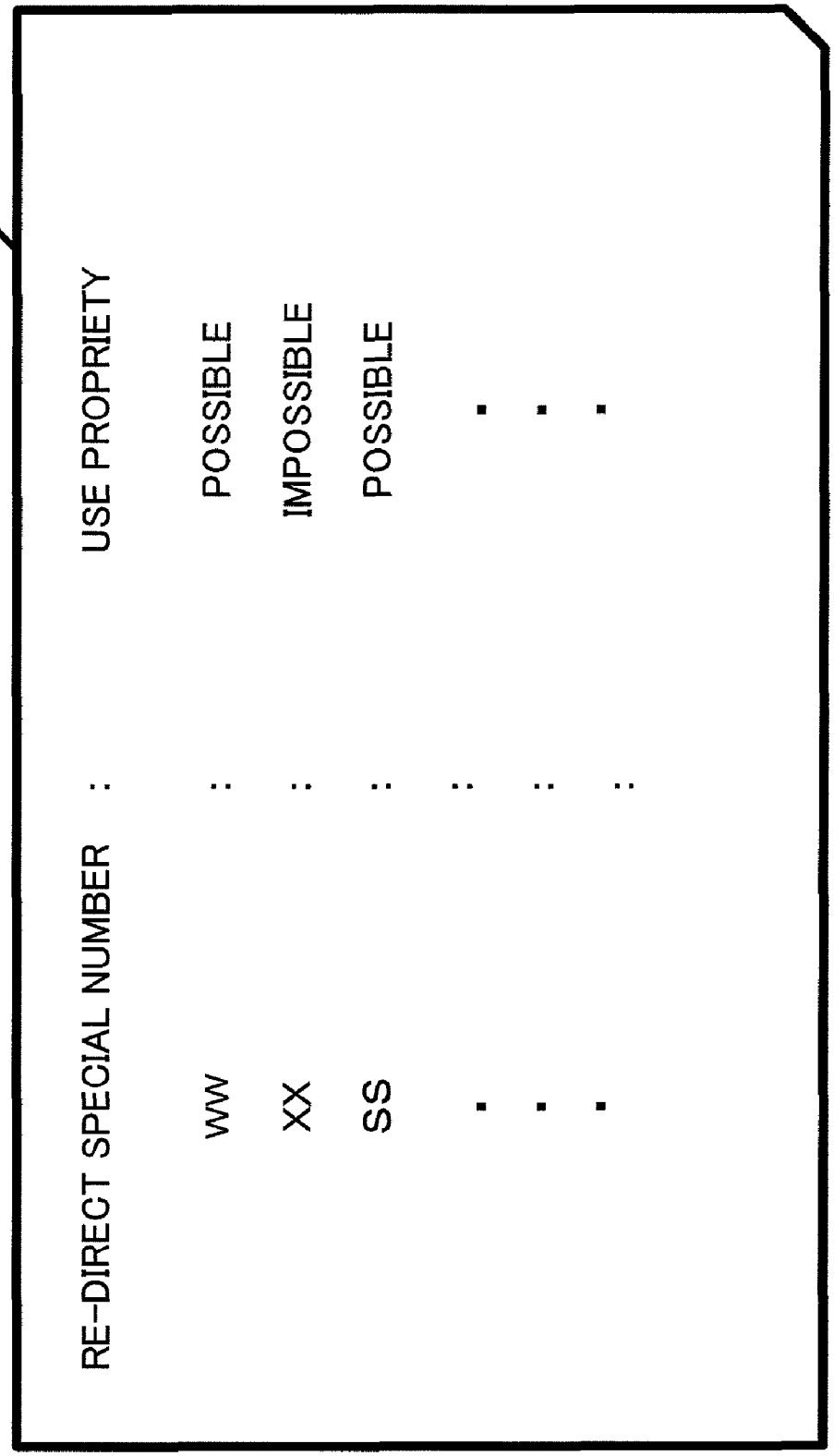
FIG. 20 is a diagram showing an example of a list of re-direction special numbers according to the second embodiment.

FIG. 20 is a diagram showing an example of a list of special numbers. The list of special numbers T500 contains special numbers each including information for identifying an MGCF that can be a move destination MGCF and information indicating that the call is a bypass call, and states indicating whether or not the special numbers are currently available. The move source MGCF 400 refers to the list of special numbers T500, and selects a special number from among the special numbers available for re-direction. The list of special numbers T500 can be updated at any time on the basis of information transmitted from other MGCFs.

Upon receiving the message from the message control part 420, the normal message operation part 430 performs a message operation of the case where a call is not re-directed.

The load information T100, the re-direction necessity information T200, the list of special numbers T500, etc., may be stored in a storage part provided in the move source MGCF 400 or a storage unit provided outside the move source MGCF 400.

<<Move Destination MGCF>>

The move destination MGCF 500 of the second embodiment has functional blocks similar to those of the move destination MGCF 500 of the first embodiment shown in FIG. 11. That is, the move destination MGCF 500 of the second embodiment includes a communication management part 510, a message control part 520, a transmitting message operation part 560, and a normal message operation part 530.

The communication management part 510 receives a message from another unit, and passes the message to the message control part 520. The communication management part 510 transmits a message passed from the message control part 520 to another unit.

The message control part 520 determines whether or not the message passed from the communication management part 510 is a call bypassed by re-direction. The determination as to whether or not the message is a bypassed call is performed by determining whether or not the receiving number of the message is a special number that can be processed by the move destination MGCF 500. The message control part 520 stores in advance information indicating special numbers that can be processed by the move destination MGCF 500. If it is determined that the message is a bypassed call, the message control part 520 passes the message to the transmitting message operation part 560. The message control part 520 passes a message passed from the transmitting message operation part 560 directly to the communication management part 510.

FIG. 21 is a diagram showing an example of a re-call-signal out signal M800 including information indicating a bypass call transmitted from the toll switch 300. The re-call-out signal M800 is substantially similar to the re-call-out signal M800 of the first embodiment shown in FIG. 4, except that the special number "WW" is written in the receiving number of the re-call-out signal M800. The special number "WW" is a special number including information for identifying the move destination MGCF 500 and information indicating a bypass call.

Upon receiving a message from the message control part 520, the transmitting message operation part 560 generates a message whose move source number is reset to the receiving number. The transmitting message operation part 560 returns the newly generated message to the message control part 520. The message is similar to the normal call-out signal M100 transmitted from the legacy network subscriber terminal 100.

Upon receiving the message from the message control part 520, the normal message operation part 530 performs a message operation of the case where a call is not re-directed.

The information indicating special numbers that can be processed by the move destination MGCF 500, etc., may be stored in a storage part provided in the move destination MGCF 500 or a storage unit provided outside the move destination MGCF 500.

<Example Operation>
(Bypass Routing Sequence)

In the first embodiment, the sequence for allowing a move destination MGCF to identify information indicating a call to be re-directed on the basis of a re-direction notification message has been described with reference to FIG. 13.

Figure 18:
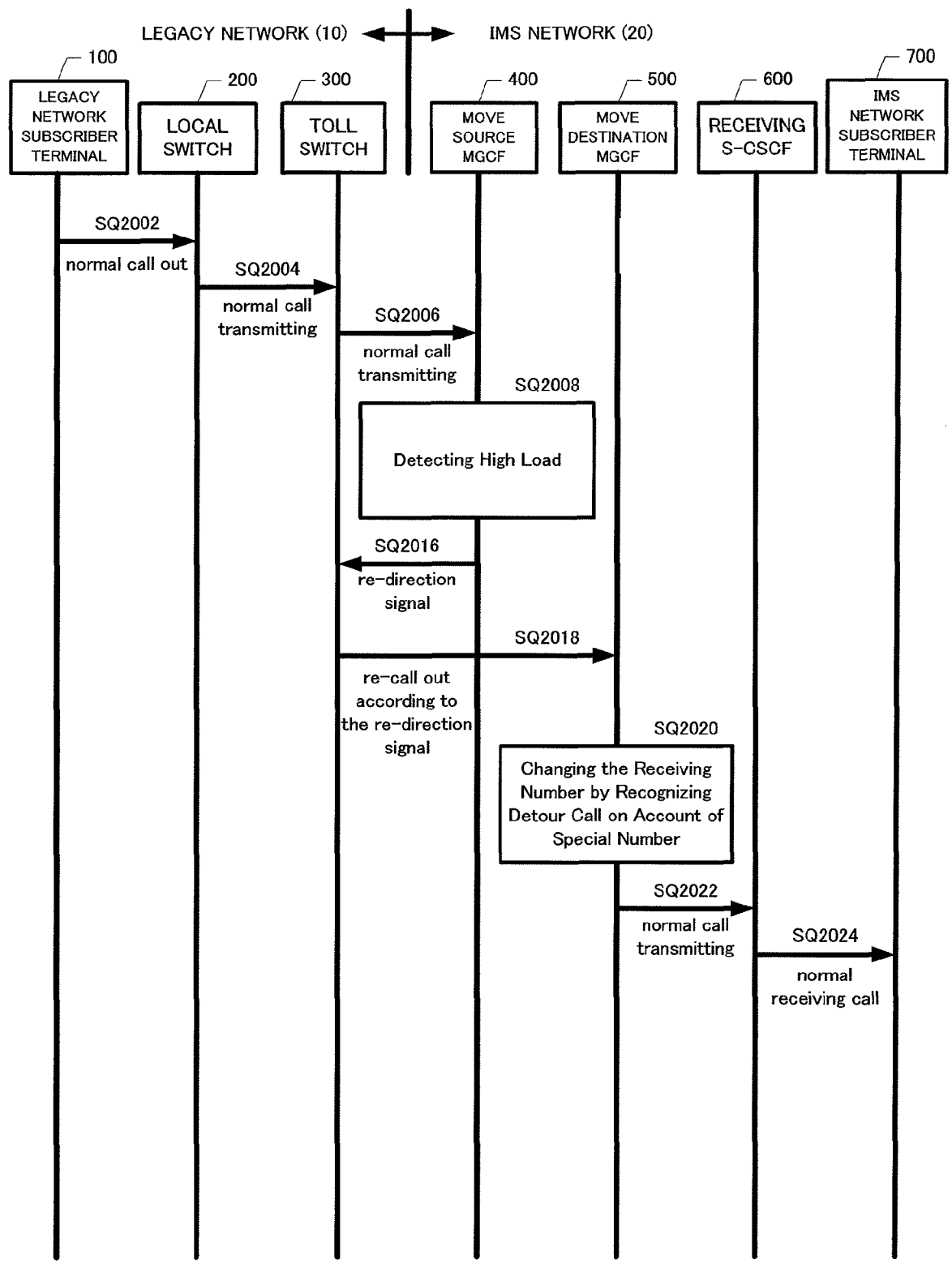
FIG. 18 is a diagram showing an example of a bypass routing sequence according to a second embodiment of the present art.

FIG. 18 is a diagram showing a sequence for allowing a move destination MGCF to identify information indicating a call to be re-directed on the basis of a special number.

The legacy network subscriber terminal 100 in the legacy network 10 makes a normal call out to the IMS network subscriber terminal 700 (SQ2002). As with the call-out signal M100 in the first embodiment shown in FIG. 2, the call-out signal M100 from the legacy network subscriber terminal 100 includes the call identification number "aaa", which is an identification number for uniquely specifying the call, the sending number "A", which is the identification number of the legacy network subscriber terminal 100, and the receiving number "X", which is the identification number of the IMS network subscriber terminal 700.

The legacy network local switch 200 transmits the normal call-out signal M100 received from the legacy network subscriber terminal 100 to the toll switch 300 (SQ2004).

The toll switch 300 transmits the call-out signal M100 received from the legacy network subscriber terminal 100 to the move source MGCF 400 in the IMS network 20 (SQ2006).

Upon receiving the call-out signal M100 from the toll switch 300, the move source MGCF 400 in the IMS network 20 checks its load, and detects that the load is high (SQ2008). The move source MGCF 400 checks the re-direction necessity information T200 maintained by the message control part 420.

The move source MGCF 400 detects that its load is high on the basis of the re-direction necessity information T200 indicating that re-direction is "necessary". Due to its high load, the move source MGCF 400 is not currently available to transmit the call-out signal M100 transferred from the toll switch 300.

Therefore, the move source MGCF 400 refers to the list of special numbers T500 maintained by the load/move destination MGCF management part 440, and selects a special number available for re-direction. The move source MGCF 400 returns to the originating toll switch 300 the re-direction signal M700 in which the special number available for re-direction regarding the move destination MGCF 500 is set as the receiving number and the initial receiving number is set as the move source number (SQ2016).

The toll switch 300 transmits the call to the move destination MGCF 500 according to a normal re-direction procedure (SQ2018). Specifically, the toll switch 300 generates the re-call-out signal M800 whose receiving number is set to the special number written in the receiving number of the re-direction signal M700 and whose move source number is set to the initial receiving number. The message type of the re-call-out signal M800 is a "call out", which is similar to that of the normal call-out signal M100. The toll switch 300 transmits the re-call-out signal M800 to the move destination MGCF 500.

Upon receiving the re-call-out signal M800, the move destination MGCF 500 determines whether or not the receiving number of the re-call-out signal M800 is a special number that can be processed by the move destination MGCF 500. If the receiving number of the message is a special number indicating re-direction that can be operated by the move destination MGCF 500, the move destination MGCF 500 recognizes the call to be a bypass call. The move destination MGCF 500 generates a call-out signal whose receiving number is set to the move source number of the re-call-out signal M800 recognized to be a bypass call (SQ2020). The move destination MGCF 500 may generate a call-out signal by updating the receiving number of the re-call-out signal M800 to "X". The move destination MGCF 500 transmits the call-out signal to the receiving S-CSCF 600 (SQ2022).

The receiving S-CSCF 600 processes the call-out signal received from the move destination MGCF 500 as a normal signaling message, and routes the resulting call to the receiving terminal, i.e., the IMS network subscriber terminal 700 (with the identification number "X") (SQ2024).

(Special-Number Setting Sequence)

The special-number setting sequence according to the second embodiment is similar to the sequences of the first embodiment shown in FIGS. 14 and 16. In the special-number setting sequence according to the second embodiment, however, the list of special numbers T500 is used instead of the list of proposed move destinations T300 in the first embodiment. Each special number in the list of special numbers T500 includes information for identifying an MGCF and information indicating that the call is a bypass call.

According to the second embodiment, since each special number includes information for identifying a move destination MGCF and information indicating a bypass call, the move destination MGCF can merely refer to the receiving number (i.e., special number) of a call to determine that the call is a bypass call. Therefore, there is no need for a move source MGCF to notify the move destination MGCF in advance that the call is to be bypassed through the move destination MGCF. Upon receiving a call including a special number indicating a bypass call, the move destination MGCF can determine that the call is a bypass call, and can correctly transmit the call.

According to the second embodiment, when routing a call via a bypass, a move source MGCF does not transmit a re-direction notification message to a move destination MGCF, and transmits a re-direction signal to a toll switch. Therefore, the call can be more quickly bypassed.

What is claimed is:

1. A gateway device for establishing connection between a telephone network including a re-direction function and an Internet protocol multimedia subsystem (IMS) network, and transmitting a call-out signal from a device located in the telephone network to a device located in the IMS network, the gateway device comprising:
  a re-direction notification receiving part to receive from another gateway device a re-direction notification including call identification information included in the call-out signal received by the another gateway device;
  a storage part to store the call identification information included in the re-direction notification;
  a re-direction notification response generating part to generate a response to the re-direction notification;
  a re-direction notification response transmitting part to transmit the response to the another gateway device;
  a receiving part to receive a re-call-out signal transmitted from the telephone network in response to a re-direction request issued by the another gateway device, the re-call-out signal including move-source-device identification information to which receiving-device identification information included in the call-out signal is set, and the receiving-device identification information to which identification information identifying the gateway device is set;
  a call processing part to generate, when call identification information identifying the re-call-out signal matches a call identification information item stored in the storage part, a call-out signal including the receiving-device identification information to which the move-source-device identification information included in the re-call-out signal is set, and
  a transmitting part to transmit the call-out signal generated by the call processing part to a receiving device associated with the receiving-device identification information included in the call-out signal.

2. The gateway device according to claim 1, further comprising:
  a load managing part to manage a load of the gateway device;
  a congestion notification transmitting part to transmit a congestion notification including the identification information identifying a first gateway device to a second gateway device to prohibit the second gateway device from selecting the first gateway device as a move-destination gateway device when the load of the first gateway device managed by the load managing part is not less than a maximum load within which call processing is possible; and
  a normal-state notification transmitting part to transmit a normal-state notification including the identification information identifying the first gateway device to the second gateway device to allow the second gateway device to select the first gateway device as a move-destination gateway device when the load of the first gateway device managed by the load managing part is less than the maximum load within which call processing is possible.

3. The gateway device according to claim 2, further comprising:
  a storage part to store a list having identification information for identifying at least another gateway device being selectable as a move-destination gateway device;
  a congestion notification receiving part to receive from the another gateway device a congestion notification including the identification information identifying the another gateway device;
  a normal-state notification receiving part to receive from the another gateway device a normal-state notification including the identification information identifying the another gateway device; and
  a proposed-move-destination-gateway-device managing part to remove from the list the identification information identifying the another gateway device included in the congestion notification, and to add to the list the identification information identifying the another gateway device included in the normal-state notification.

4. A gateway device for establishing connection between a telephone network including a re-direction function and an Internet protocol multimedia subsystem (IMS) network, and transmitting a call-out signal from a device located in the telephone network to a device located in the IMS network, the gateway device comprising:
  a storage part to store a special identification information item indicating that a gateway device allows a call to be bypassed;
  a receiving part to receive a re-call-out signal transmitted from the telephone network in response to a re-direction request issued by another gateway device, the re-call-out signal including move-source-device identification information and receiving-device identification information;

a call processing part to generate, when the receiving-device identification information included in the re-call-out signal matches one of the special identification information items stored in the storage part, a call-out signal including the receiving-device identification information to which the move-source-device identification information included in the re-call-out signal is set; and a transmitting part to transmit the call-out signal generated by the call processing part to a receiving device associated with the receiving-device identification information included in the call-out signal.

5. The gateway device according to claim 4, further comprising:

a load managing part to manage a load of the gateway device;

a congestion notification transmitting part to transmit a congestion notification to another gateway device to prohibit the another gateway device from selecting the gateway device as a move-destination gateway device when the load of the gateway device managed by the load managing part is not less than a maximum load within which call processing is possible, the congestion notification including special identification information including identification information identifying the gateway device and indicating a bypass call; and a normal-state notification transmitting part to transmit a normal-state notification to the another gateway device to allow the another gateway device to select the gateway device as a move-destination gateway device when the load of the gateway device managed by the load managing part is less than the maximum load within which call processing is possible, the normal-state notification including the special identification information including identification information identifying the gateway device and indicating a bypass call.

6. The gateway device according to claim 5, wherein the storage part stores a list having a special identification information item including identification information identifying another gateway device selectable as a call move destination and indicating a bypass call, the gateway device further comprising:

a congestion notification receiving part to receive from the another gateway device a congestion notification including identification information identifying the another gateway device;

a normal-state notification receiving part to receive from the another gateway device a normal-state notification including identification information identifying the another gateway device; and a proposed-move-destination-gateway-device managing part to remove from selectable special identification information items in the list a special identification information item including the identification information identifying the mother gateway device included in the congestion notification and indicating a bypass call, and adding to selectable special identification information items in the list a special identification information item including the identification information identifying the another gateway device included in the normal-state notification and indicating a bypass call.

* * * * *